US012172672B1

(12) United States Patent
Schleede

(10) Patent No.: US 12,172,672 B1
(45) Date of Patent: Dec. 24, 2024

(54) MACHINE-LEARNED MODEL INCLUDING UNCERTAINTY GENERATION

(71) Applicant: Zoox, Inc., Foster City, CA (US)

(72) Inventor: Peter Scott Schleede, El Dorado Hills, CA (US)

(73) Assignee: Zoox, Inc., Foster City, CA (US)

( * ) Notice: Subject to any disclaimer, the term of this patent is extended or adjusted under 35 U.S.C. 154(b) by 228 days.

(21) Appl. No.: 18/070,749

(22) Filed: Nov. 29, 2022

(51) Int. Cl.
*B60W 50/00* (2006.01)
*B60W 60/00* (2020.01)
*G05B 13/02* (2006.01)
*G07C 5/02* (2006.01)

(52) U.S. Cl.
CPC ...... *B60W 60/001* (2020.02); *B60W 50/0097* (2013.01); *G05B 13/0265* (2013.01); *G07C 5/02* (2013.01); *B60W 2050/0031* (2013.01); *B60W 2520/06* (2013.01); *B60W 2520/10* (2013.01)

(58) Field of Classification Search
CPC .......... B60W 60/001; B60W 50/0097; B60W 2050/0031; B60W 2520/06; B60W 2520/10; G05B 13/0265; G07C 5/02
See application file for complete search history.

*Primary Examiner* — Mathew Franklin Gordon
(74) *Attorney, Agent, or Firm* — EIP US LLP

(57) ABSTRACT

A remote computer system may receive data representative of a state of an autonomous vehicle traversing an environment. A representation of the environment and the state may be input to a first machine learned model, which may output a vector representation of the environment at a first time. The vector representation may be input to a second machine learned model, which may output a second vector representation of the environment at a second time. A third machine learned model may receive the second vector representation and may output a mean velocity and a mean steering angle of the vehicle at the first time and associated uncertainty variables. Based on the mean velocity, the mean steering angle, and the uncertainty variables, a predicted vehicle state at the first time and an associated uncertainty may be determined and the vehicle may be controlled based on the predicted vehicle state and the uncertainty.

20 Claims, 11 Drawing Sheets

MACHINE-LEARNED MODEL INCLUDING UNCERTAINTY GENERATION

BACKGROUND

Various complex systems may use machine learning. As an example, machine learning may be used in autonomous vehicles to detect objects proximate the vehicle to enable the vehicle to respond accordingly. When relying on uncertainties associated with such machine learned models, inaccuracies in detections, predictions, or uncertainties may create unsafe situations.

BRIEF DESCRIPTION OF DRAWINGS

The detailed description is described with reference to the accompanying figures. The use of the same reference numbers in different figures indicates similar or identical components or features.

DETAILED DESCRIPTION

Figure 1:
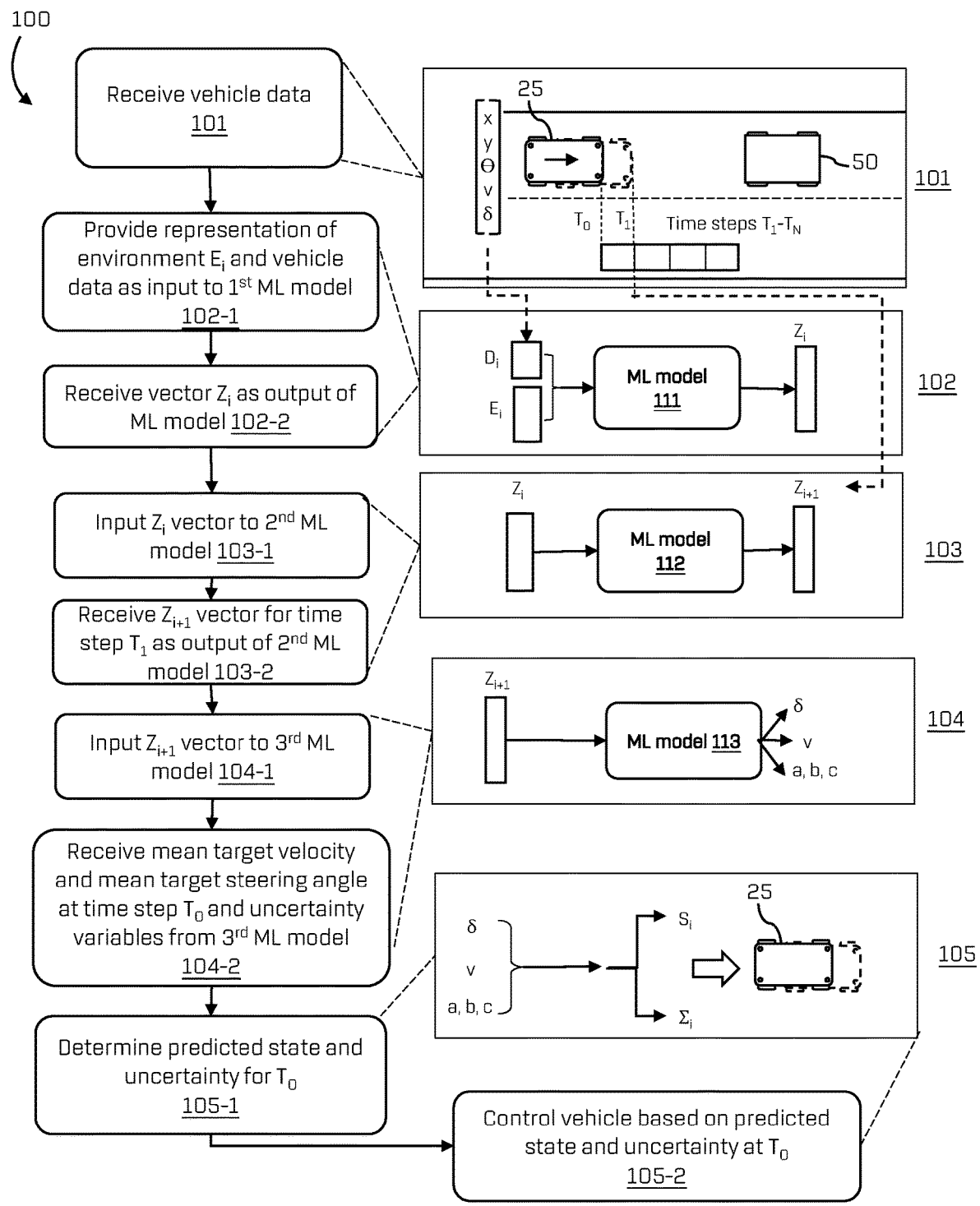
FIG. 1 depicts an example process of using a machine learned model to predict a trajectory and associated uncertainty (ies) for an autonomous vehicle.

This application relates to techniques, processes, methods, systems, and computer-readable media for training one or more machine learning components (also referred to as machine learned models) and executing the one or more machine learned models to generate a predicted trajectory for an object or a vehicle and, in some examples, associated uncertainty (ies) for the predicted trajectory, such as a covariance matrix associated with a control and/or a covariance matrix associated with an object or vehicle state.

In various examples, an autonomous or semi-autonomous vehicle traverses an environment along a route in accordance with a planned trajectory (also referred to herein as a "trajectory"). The trajectory may be one of multiple possible trajectories determined with respect to the route, where a planner component of a vehicle computing system on the vehicle or a remote computing system may determine the multiple possible trajectories and determine a candidate trajectory for the vehicle to carry out. A trajectory may comprise a plurality of trajectory steps over a period of time, where a period of time can comprise a series of successive points in time, otherwise referred to as a sequence of time steps. A trajectory step may be associated with a predicted vehicle state of the autonomous vehicle at a point in time, in an example. The vehicle state may comprise associated controls (e.g., acceleration, braking, turning, etc.) and positional variables (e.g., co-ordinates). Multiple trajectory steps may correspond to a prediction of multiple vehicle states over a sequence of time steps. A state of a vehicle may refer to one or more variables (also referred to as properties) associated with the vehicle at a given point in time.

The one or more variables may include dynamic variables which are expected to vary over time, for example, one or more kinematic variables such as the position and/or orientation of the entity, along with time derivatives of these quantities, such as velocity and/or rate of rotation. Additionally, or alternatively, the state may include one or more static variables which may be expected to remain constant over time, including geometric properties of the vehicle such as dimensions, extent, and/or shape of the vehicle, etc.

The state of a vehicle may be represented as a vector with components representing respective state variables. The components of the vector may for example represent one or more of planar (x or horizontal) position, planar velocity, yaw and yaw rate. Other variables may additionally, or alternatively, be included as components of the vector, such as vertical (y) position, pitch, or roll, along with their associated time derivatives. As an example, a vector representing a vehicle state may comprise variables such as an x-position, a y-position, a yaw value, a velocity and a steering angle.

The techniques described herein may be used to generate a predicted trajectory for a vehicle and, in some scenarios, an uncertainty distribution, also referred to as an uncertainty metric or an uncertainty, associated with the predicted trajectory. As described above, the predicted trajectory may be defined in relation to the predicted state of the vehicle at a given point in time or at multiple points in time. As an example, the predicted trajectory may span a time period comprising a plurality of time steps and comprise a predicted state of the vehicle at each of the plurality of time steps. In at least some examples, the predicted trajectory may be determined based at least in part on reacting to predicted behavior of other objects in the environment proximate the vehicle, rules of the road, etc. Whilst reference is made to a "predicted" trajectory, the term "predicted" is used to encompass any trajectory that is defined before a vehicle executes it so a "predicted trajectory" encompasses a "planned trajectory".

In some cases, calculations and models used to generate a predicted state of the vehicle at a given time may not fully reflect the behaviour of the vehicle in the environment, such as due to uncertainties associated with measurements, control, vehicle models, etc. This means that the actual state of the vehicle (also referred to as the ground truth state or the observed state) at the given time may not be the same as the predicted state of the vehicle, which, in turn, means the ground truth trajectory of the vehicle may differ from the predicted trajectory of the vehicle. For example, one or more differences between the actual state of a vehicle and its predicted state could arise due to an assumption in a mathematical calculation of how variables defining the state of the vehicle relate to one another over time, such as an assumption that two variables have a linear relationship whereas in practice the relationship between the two variables may not be linear.

Accordingly, the uncertainty distribution of a predicted trajectory may represent one or more uncertainties associated with predicted states of the vehicle over time. In examples, an uncertainty relating to a predicted state can be understood as providing bounds for the predicted state of the vehicle that account for variations in the state of the vehicle. For example, an uncertainty may account for variations in the x and y positional coordinates of the vehicle and span a region defined by varying the x and y positional coordinates centered at the predicted state, thereby providing a distribution associated with the predicted state, for example, a circular region about the x and y coordinates of the predicted state.

In particular, the uncertainty distribution may define a region (within the aforementioned bounds) relating to a predicted state of the vehicle, where the region encompasses a plurality of possible states of the vehicle at a given time. The uncertainty distribution may be represented by a covariance matrix relating to two or more variables defining the state of the vehicle; for example, there may be a covariance matrix determined for each time step of the predicted trajectory that relates to the x and y positional coordinates of the vehicle. Such uncertainties associated with predicted states may be based at least in part on uncertainties associated with the vehicle controls themselves (acceleration, braking, turning, etc.). As such, as discussed herein, an uncertainty may be associated with either the uncertainty of the state of the vehicle at a particular time or specifically the uncertainty associated with vehicle controls at a particular time.

A machine learned model may be trained to generate a predicted trajectory and a corresponding uncertainty distribution for an autonomous or semi-autonomous vehicle. Examples of a machine learned model include a neural network comprising an input layer, an output layer and one or more intermediate layers or a portion of a neural network (for instance, a plurality or subset of nodes of a neural network of a single or multiple layers). In various examples, such a predicted trajectory may be determined by recursively estimating the state of all objects in the environment proximate the vehicle (and, in some cases, inclusive of the vehicle).

Data associated with an environment being traversed by the vehicle (which, in some examples, may be inclusive of rules of the road, additional objects proximate the vehicle (cars, trucks, pedestrians, etc.), lane markings, traffic signals, etc.) may be represented by an embedding by inputting, for example, a multi-channel image representation of the environment into a machine learned model, such as an encoder, to generate a vector representative of the driving environment (also referred to as a scene embedding). In some such examples, various data may be used as the different channels in such a multi-channel image (e.g., objects and object states in one channel, lane markings in another channel, and so on).

In some examples, a machine learned model may receive an input vector representative of a scene embedding and a state of an autonomous vehicle at a first time, for example, a current time. The machine learned model may be trained to output a predicted scene embedding, or a vector representative thereof, and a predicted vehicle state for a point in time in the future, which is to say a point in time after the first time, such as a point in time after one or more time steps from the first time.

The machine learned model may be an autoregressive component, in that the model is applied recursively by providing the output back to the machine learned model as an input in a subsequent pass or iteration. For example, a vector representative of a predicted scene embedding and a predicted vehicle state for a first point in time output by the machine learned model may be input to the machine learned model in order for the machine learned model to generate a vector representative of a predicted scene embedding and a predicted vehicle state for a second, later point in time. Such a machine learned model may be used to determine a sequence of predicted trajectory steps, and, in some examples, an uncertainty distribution per step, whereby the output is provided back as an input to determine the next predicted state of the vehicle and the next associated uncertainty, for example, at the subsequent time step, and so on. This iterative process can be performed any number of times to generate a predicted trajectory comprising a predicted vehicle state and an uncertainty distribution for a sequence of time steps (also referred to as a sequence of points in time). The machine learned model may be implemented as a multilayer perceptron (MLP) or other type of neural network.

An uncertainty associated with a vehicle state for a given time step may be determined based on an uncertainty associated with one or more controls of the vehicle at a given time step and an uncertainty associated with one or more positional variables of the vehicle at a given time step. In one example, an uncertainty associated with one or more controls of the vehicle may be combined with an uncertainty associated with one or more positional variables of the vehicle to determine an uncertainty of a vehicle state.

The training of the machine learned model may involve evaluating a predicted trajectory and an associated uncertainty distribution for one or more time steps by comparing the predicted vehicle state and related uncertainty for each time step to a ground truth trajectory of the vehicle at the same time step. Differences between the predicted state of the vehicle and the ground truth state of the vehicle and the uncertainty distribution and a distribution of the ground truth state of the vehicle can be used to train the machine learned model. As part of the training, the machine learned model may be modified to correct for errors that occur as a result of the autoregressive trajectory prediction process by bringing the predicted trajectory and the associated uncertainty distribution closer to the ground truth trajectory. As will be described in detail herein, additional techniques may be used to reduce the computational resources required for generating a predicted trajectory and training a machine learned model, including, for example, coarse-step and fine-step techniques.

A time step may be a period of time between two points in time, a start time and an end time, and can be considered as the difference in time between the start time and the end time. For example, where a start time is the current time (0 seconds) and the end time is at a future time of 2 seconds, the time step is 2 seconds (2 seconds minus (−) 0 seconds). In certain parts of this disclosure reference may be made to a state of a vehicle "at" a given time step. A state of a vehicle "at" a given time step may be the state of the vehicle after the given time step has elapsed, that is, the state of the vehicle at the end time of the time step. Continuing with the previous example, the state of the vehicle at the first time step (that starts at 0 seconds and ends at 2 seconds) is the state of the vehicle at 2 seconds (the end time). In some examples, reference may also be made to a state of a vehicle "at a time", in such instances, the meaning of the term "at a time" is interchangeable with the meaning of the term "at the time step", as set out above. For example, a state of a vehicle at a time step may be the state of the vehicle at point in time, such as a first time.

The trajectory prediction techniques described herein may use at least one of a so-called coarse-step trajectory prediction technique implemented by a machine learned model and a so-called fine-step trajectory prediction technique implemented by the same or a different machine learned model, where both techniques may generate a prediction of a vehicle state at a future point(s) in time. For instance, the coarse-step technique may predict a vehicle state at a point in time after X time steps, whereas the fine-step technique may predict a vehicle state at a point in time after Y time steps, where X is greater than Y. In additional or alternative examples, the size of the time steps in between successive predictions may differ between the coarse-step and fine-step techniques such that the time period associated with a time step of the coarse technique (a "coarse step") is larger than that of the fine technique (a "fine step"). In this way, the coarse step technique may take larger steps through time between each prediction compared to the fine-step technique. In at least some such examples, the coarse-step technique may predict a vehicle state at a frequency that is lower than the frequency at which the fine-step technique may predict a vehicle state. As such, the coarse-step technique may make fewer predictions than the fine-step technique over a given period of time.

As an example, the coarse-step technique may predict a vehicle state at a point in time after multiple time steps and the fine-step technique may predict a vehicle state at a point in time after each, single, time step of the multiple time steps. In examples, a combination of the coarse-step technique and the fine-step technique may be used in a two-phase prediction technique. In such a scenario, in the first phase, the coarse-step technique may generate a prediction of a vehicle state at a time after multiple time steps. In the second phase, the fine-step technique may generate a prediction of a vehicle state after each time step of the multiple time steps within the coarse-step. In an alternative second phase, the fine-step technique may generate a prediction of a vehicle state at a point in time (for example, corresponding to a single time step) after the coarse-step, where the amount of time between the end of the coarse-step and the point in time (e.g. the single time step) is less than the amount of time covered by a subsequent coarse step (multiple time steps). Here, for both examples of the second phase, a fine-step prediction of the vehicle state at a given time step may be used as an input for generating a prediction of the vehicle state at the next time step. In addition, the coarse-step prediction of the vehicle state may be used as an input to the fine-step technique for generating a prediction of the vehicle state either at a point in time after the coarse-step or at each time step within the coarse-step.

A machine learned model that is trained to implement the coarse-step trajectory prediction technique may be the same as or different from a machine learned model that is trained to implement the fine-step trajectory prediction technique. Where different machine learned models are used for the coarse and fine step trajectory prediction techniques, the machine learned models may be different neural networks or different subsets thereof. Where the same machine learned models are used, the coarse and fine techniques may be implemented using the same neural network or subset thereof. In an example, coarse and fine step backpropagation techniques may be executed in parallel, with at least some overlap, or successively within the same neural network, whereby backpropagation is performed with respect to one or more sections of the neural network using one or both of the herein described coarse and fine step techniques.

As described above, a machine learning (ML) based trajectory prediction technique may be implemented to determine one or more possible trajectories for a vehicle based on input vehicle states and driving environment data. An ML-based trajectory prediction technique can provide advantages over a rules-based technique, such as improved responses to new driving environments and new scenarios for which rules have not been created. Some ML-based trajectory prediction techniques may output an entire vehicle trajectory from a single iteration of a neural network, and therefore require large and complex networks and extensive training processes. Examples of a machine learning based technique for generating a trajectory for a vehicle can be found, for example, in US Patent Application Ser. Number U.S. Ser. No. 17/855,088, filed Jun. 30, 2022 and entitled "Machine Learned Component for Vehicle Trajectory Generation", which is incorporated herein by reference in its entirety for all purposes.

The provision of a candidate trajectory and/or multiple possible trajectories for a vehicle may overly restrict operation of the vehicle. In addition, training of a machine learned model to generate a predicted trajectory may require resource intensive computing operations firstly due to the length of time over which a predicted trajectory is required (and the associated large number of operations required to train a machine learned model over a large number of time steps) and secondly, due to the autoregressive nature of predicting a trajectory, where the later parts of the trajectory are dependent on the earlier parts of the trajectory.

To address these issues, the inventors have developed the various techniques described herein for determining an uncertainty distribution for a predicted trajectory, both as an uncertainty with respect to the vehicle state and with respect to the associated controls between states. This enables a vehicle computing system to determine that there are multiple paths that the vehicle may take (within the bounds of the uncertainty distribution) associated with the given predicted trajectory, for the vehicle to travel from a first location to a second location. The vehicle computing system can operate the vehicle with respect to a path within those bounds but not necessarily in strict accordance with the trajectory While generally providing for safer operation by taking such uncertainty (ies) into account. This can provide greater flexibility in the operation of the vehicle and can enable improved evaluation of features and functions of the vehicle, which can enhance the driving behaviour and, ultimately, the safety of the vehicle.

The inventors have also developed a two-phase trajectory prediction technique, along with training therefor, that can use a machine learned model to combine a coarse-step trajectory prediction technique with a fine-step trajectory prediction technique to enable a more accurate, quicker, and less intensive trajectory generation process and a quicker and less intensive backpropagation process for training the machine learned model.

As will be shown, the techniques described herein provide advantages over rule-based and other machine learning based trajectory prediction techniques. For instance, a determined uncertainty of a state of a vehicle at a first time, for example after a first time step of a trajectory, may be used to refine a determination of uncertainty of a state of the vehicle at a second, later time, for example after a second time step of the trajectory. In this way, an uncertainty metric can be propagated forward per time step of the trajectory which enables a more accurate assessment of the trajectory and the uncertainty itself and thus can also enable improved operation of the vehicle by the vehicle computing system. That is, the coupling of uncertainty between earlier and later time in a trajectory can improve the quality of evaluation of a given trajectory, specifically, a time thereof, and the quality of evaluation of subsequent operations of the vehicle by the vehicle computing system, which may improve the functioning, safety, and efficiency of the vehicles operating in driving environments. As an example, the uncertainty distribution over a predicted trajectory may provide a region from which an alternative trajectory may be sampled, for example, by the computing system of the vehicle, and used to generate a revised trajectory and alter operations of the vehicle accordingly. Additionally, the techniques described herein determine an uncertainty associated with the controls of a vehicle through use of an ML model, which enables a more accurate assessment of the vehicle state (that may comprise control variables) at a current time and at future times.

Combining coarse-step and fine-step trajectory prediction and backpropagation techniques may enable a quicker and less resource-intensive trajectory prediction process and a quicker way of backpropagating gradients to certain elements of a machine learned model because only certain elements of the model are involved in the coarse process. Having a quicker way to backpropagate gradients to earlier elements of the machine learned model may avoid overcorrection of these earlier elements to account for differences between later parts of the predicted trajectory and later parts of a ground truth trajectory, where the overcorrection can lead to unrealistic or impractical earlier steps (for example, unrealistic predicted states of an autonomous vehicle) of a predicted trajectory. As a result, the operation of an autonomous vehicle in accordance with a predicted trajectory within a real-world driving environment may be improved. Similarly, the operation of an autonomous vehicle within a simulated environment may be improved. By improving the driving behaviour of the autonomous vehicle, the functioning, safety, and efficiency of the autonomous vehicle is also improved.

In examples, there are provided techniques (including systems, non-transitory computer readable media and methods) that may comprise: determining a first vector representation of an environment proximate a vehicle at a first time; inputting, into a first machine learned model, the first vector representation of the environment; receiving, from the first machine learned model, an output comprising a second vector representation of the environment at a second time, where the second time is subsequent to the first time; and determining, based on the second vector representation, a predicted vehicle state at the first time and a first uncertainty associated with the predicted vehicle state at the first time.

In examples, determining the predicted vehicle state at the first time and the first uncertainty associated with the predicted vehicle state at the first time may comprise: inputting, into a second machine learned model, the second vector representation; receiving, from the second machine learned model, a second output comprising a velocity and a steering angle associated with the vehicle at the first time and a plurality of uncertainty variables associated with the velocity and the steering angle; determining the predicted vehicle state at the first time and the first uncertainty associated with the predicted vehicle state at the first time based at least in part on: the second output, a position and an orientation of the vehicle at the first time, and a second uncertainty associated with the position and the orientation of the vehicle at the first time.

Examples may also comprise: determining, based at least in part on the predicted vehicle state and the associated first uncertainty at the first time, an update matrix; determining, based at least in part on a dynamics model, a predicted vehicle state at the second time; and determining, as a third uncertainty associated with the predicted vehicle state at the second time, a product of the update matrix and the first uncertainty associated with the predicted vehicle state at the first time.

Examples may also comprise determining, based on the predicted vehicle state at the first time and the first uncertainty associated with the predicted vehicle state at the first time, a predicted vehicle state and a third uncertainty associated with the predicted vehicle state at the second time; determining a position and an orientation of the vehicle at the second time from the predicted vehicle state at the second time; and determining a fourth uncertainty associated with the position and the orientation of the vehicle at the second time based at least in part on the third uncertainty associated with the predicted vehicle state at the second time.

Examples may also comprise: inputting the second vector representation of the environment at the second time to the first machine learned model; receiving, from the first machine learned model, a second output comprising a third vector representation of the environment at a third time; and determining a predicted vehicle state at the third time and a fifth uncertainty associated with the predicted vehicle state at the third time based at least in part on: the third vector representation; a position and an orientation of the vehicle determined for the third time; and a sixth uncertainty associated with the position and the orientation of the vehicle determined for the third time.

In examples, the first uncertainty associated with the predicted vehicle state at the first time may comprise a first covariance matrix and the examples may further comprise: determining that the first covariance matrix is singular; and identifying a second covariance matrix to replace the first covariance matrix, wherein the second covariance matrix is an invertible matrix.

In examples, with the first machine learned model may be trained based at least in part on determining a difference between a ground truth trajectory of the vehicle recorded in log data and the predicted vehicle state at the first time and the uncertainty associated with the predicted vehicle state to determine one or more differences, and modifying a parameter of the first machine learned model based at least in part on the one or more differences.

Examples may further comprise: determining a loss function for the second machine learned model based on the one or more differences; and modifying the second machine learned model to minimize the loss function, wherein the modifying may comprise: skipping one or more respective nodes of the second machine learned model, such that a gradient relating to a function of a respective node remains unchanged during the modifying.

The techniques described herein can be implemented in a number of ways to improve the operation of autonomous vehicles within real-world driving environments and/or the functioning of driving simulation systems. Example implementations are provided below with reference to the accompanying figures. Although discussed in the context of an autonomous vehicle, the methods, apparatuses, and systems described herein can be applied to a variety of systems and is not limited to autonomous vehicles. In another example, the techniques can be utilized in an aviation or nautical context. Additionally, the techniques described herein can be used with real data (e.g., captured using sensor(s)), simulated data (e.g., generated by a simulator), or any combination of the two.

Generating a Predicted Trajectory and Associated Uncertainty

FIG. 1 illustrates an example process 100 of using a machine learned model to predict a trajectory and associated uncertainty for an autonomous vehicle, such as vehicle 25. Whereby the vehicle 25 may be controlled based on the predicted trajectory and associated uncertainty.

At step 101, the vehicle 25 is depicted as traversing an environment in proximity of an object 50. Data, $D_i$, associated with the vehicle 25 traversing the environment may be received at a remote computer system, located at a different location to that of the vehicle 25, such as computing device 1032 of FIG. 11. The "i" subscript used throughout this disclosure in relation to different properties (for example, data, state of a vehicle) is used to denote an initial occurrence of the related property at a first point in time, where future occurrences are represented by the subscripts "i+1", "i+2", etc. In the example of $D_i$, the "i" subscript indicates that the data is associated with a first point in time. The data may be sensor data collected by a sensor system of the vehicle 25, for example, sensor system 1006 of FIG. 11, whereby the data is representative of the surroundings of the vehicle 25 in the environment and the relative positioning of the vehicle 25, and possibly the object 50, therein, such that a remote computer system can generate a representation of the vehicle 25 and display the representation on a display.

The data may be representative of a vehicle state S and comprise one or more of a position, an orientation, a steering angle, a velocity, or an acceleration of the vehicle 25. In some cases, one or more properties of the vehicle may be derivable from the data associated with the vehicle, for example, a steering angle of the vehicle may be derivable from a directional aspect of the velocity of the vehicle. Thus, the state, S, of the vehicle 25 at a point in time, $T_N$, can be representable by a plurality of variables. For example, the state $S_i$ of the vehicle 25 at a current time $T_0$ (also referred to as the current state of the vehicle 25) can be represented by the following variables: an x position, a y position, a yaw angle, a velocity, v, and a steering angle, $\delta$. The subscript "0" of $T_0$ is used to denote a current time or a future current time, whereby the predicted trajectory is determined for future time steps or points in time $T_1$-$T_N$ in relation to $T_0$, where N is the number of time steps of the predicted trajectory and $T_1$-$T_N$ indicates the number of time steps between $T_1$ (the first time step after $T_0$) and $T_N$ (the nth time step after $T_0$). From the perspective of $T_0$, the future time steps $T_1$-$T_N$ have not yet occurred so they are considered "ahead" of the current time $T_0$.

Predicting a trajectory for a vehicle, such as vehicle 25, may occur many times as the vehicle 25 traverses the environment or before. For instance, a new predicted trajectory may be generated each time a given time interval has elapsed, for example, every P seconds, where P may be a fraction of a second such as 100 ms or otherwise. Accordingly, as the vehicle navigates through the environment its current state is changing and thus the current state of the vehicle is different for each newly generated predicted trajectory.

A predicted trajectory of the vehicle 25 may comprise a plurality of time steps $T_1$-$T_N$ and a plurality of predicted states of the vehicle 25 at each of the respective time steps. Accordingly, generating a predicted trajectory may comprise predicting the state of the vehicle 25 at a plurality of future points in time, for example, at each of time steps $T_{1-N}$, based on its current state or current predicted state.

The techniques described herein determine an uncertainty metric associated with each predicted state of the vehicle 25. In the example of FIG. 1, the uncertainty metric for a given time step is in the form of a covariance matrix, described in more detail in relation to step 203 of FIG. 2 and FIG. 4. Steps 102 to 105 provide an example process for generating a predicted trajectory for the vehicle 25 and an associated uncertainty distribution and controlling the vehicle 25 based on the same. Steps 102 to 105 of FIG. 1 represent the generation of a single new predicted trajectory. In other examples, the steps 102 to 105 may be performed each time a given time interval has elapsed, as described above, for example, every P seconds, as described above. Further detail relating to an example trajectory prediction technique is provided in relation to FIGS. 7 and 8.

At step 102-1, a representation of the environment $E_i$ and the data $D_i$ defining the vehicle at a current time $T_0$ (also referred to as a first time) may be input to a first machine learned model 111. The representation of the environment $E_i$ may be a multi-channel image representation of the environment, such as a top-down multi-channel representation of the environment, for instance, a 128-by-128 8-channel data structure. In some such examples, various data may be used as the different channels in such a multi-channel image (e.g., the multi-channels may comprise at least two of the following: objects and object states in one channel; lane markings in another channel; traffic light states in another channel; locations of roadways, sidewalks, crosswalks etc. in another channel; locations occupied by static and/or dynamic objects in another channel and so on). Alternatively, the representation of the environment $E_i$ may be a vector-based representation of the environment, which may be a fixed-sized vector, such as a fixed-size 128-dimension vector, although other dimensions and vector sizes may be used. In an example, the first machine learned model 111 may be an encoder.

At step 102-2, a vector $Z_i$ may be received as output of the first machine learned model 111. The vector $Z_i$ is a first vector representation of the environment and state of the vehicle 25 at $T_0$.

At step 103-1, the vector $Z_i$ may be input to a second machine learned model 112. At step 103-2, a vector $Z_{i+1}$ may be received as an output of the second machine learned model 112. The vector $Z_{i+1}$ is a second vector representation of the environment at a future time, in this example, at a second time, time step $T_1$.

Vectors $Z_i$ and $Z_{i+1}$ may be fixed-size vectors, for example, 128-dimension vectors.

At step 104-1, the vector $Z_{i+1}$ may be an input to a machine learned model 113. Of course, though depicted as a second and third machine learned model, the invention need not be so limited. In additional or alternative examples, ML model 112 and ML model 113 may be additional layers, heads, or otherwise associated with ML model 111. Regardless, at step 104-2, one or more predicted variables of the vehicle for the first time $T_0$ may be received as an output of the machine learned model 113. The variables output by the ML model 113 are so-called "target" variables that may be applied to the vehicle at time $T_0$ for the vehicle to be aligned with the vector $Z_{i+1}$ at time $T_1$ (the "target" representation). For example, the target variables may be determined such that, were the vehicle 25 to be controlled based on the target variables, the vehicle 25 would move in such a way that at time $T_1$ the state of the vehicle 25 would be consistent with the predicted representation of the environment and the vehicle at time $T_1$ vector $Z_{i+1}$. Alignment and consistency with the vector $Z_{i+1}$ may be achieved within a margin of error or a predefined threshold. In the example of FIG. 1, the machine learned model 113 may output the following for the first time $T_0$: a mean target velocity, v; a mean target steering angle, δ; and a plurality of uncertainty terms or variables: a, b, c. Velocity and steering angle are considered to be control variables because they can be used to control the driving operation of the vehicle 100.

At step 105-1, a predicted state $S_i$ of the vehicle 25 at $T_0$ and an associated uncertainty $\Sigma_i$, also referred to as a first uncertainty associated with the predicted state of the vehicle at $T_0$, may be determined based at least in part on the output of the machine learned model 113. This is described in more detail in relation to FIG. 2. The state $S_i$ may be a "predicted" state because it is generated as part of a trajectory prediction process that predicts the state of a vehicle, such as the vehicle 25, at successive points in time. As for the velocity and steering angle, the state $S_i$ may be considered as a "target" state for the time $T_0$. In the example of FIG. 1, $T_0$ is a point in time and may not be a "current" time.

At step 105-2, the vehicle 25 may be controlled based on the predicted state $S_i$ and the associated uncertainty $\Sigma_i$. For example, operation of the vehicle 25 may be altered to avoid any obstructions within the environment that relate to the predicted state $S_i$ and/or the uncertainty $\Sigma_i$, for example, vehicle 25 may be controlled so that its path through the environment is adjusted to be within the bounds of the uncertainty $\Sigma_i$ but not necessarily directed to the predicted state $S_i$, where, for example, the predicted state $S_i$ is unsuitable due to being proximate another vehicle within the environment. In another example, the vehicle 25 may be controlled based on the target controls (velocity and steering angle) forming component parts of state $S_i$ and output by model 113.

The uncertainty terms a, b, c may be terms of a first covariance matrix K associated with the target velocity and the target steering angle. In particular, the covariance terms a, b, c may be used to determine the first covariance matrix, K, which may be a 2×2 matrix of the form: [a, c; c, b]. In other examples, the ML model 113 may be trained to output more control variables, in which case, matrix K would be a higher dimension matrix, as appropriate. Matrix K may be used in combination with the mean target velocity, v, and the mean target steering angle, δ, as basis for determining the predicted state $S_i$ of the vehicle 25 at $T_0$ and a second covariance matrix $\Sigma_i$ defined in relation to the target velocity, the target steering angle, and a horizontal position coordinate, a vertical position coordinate and a yaw angle for the autonomous vehicle at $T_0$, described in more detail in relation to FIG. 4.

Steps 103 to 105 may be repeated for each of the time steps $T_1$ through $T_N$ of the predicted trajectory recursively (e.g., by feeding back the output Z vector representation to obtain a subsequent encoding of the environment while propagating the error/uncertainty forward). In some examples, a predicted state of the vehicle 25 comprised by the output vector or portion thereof output by the machine learned model 112 can be fed back as input to model 112 to inform the determination of a next predicted state of the vehicle 25 and associated uncertainty. This is an autoregressive feedback loop that is described in more detail in relation to FIG. 3.

Figure 2:
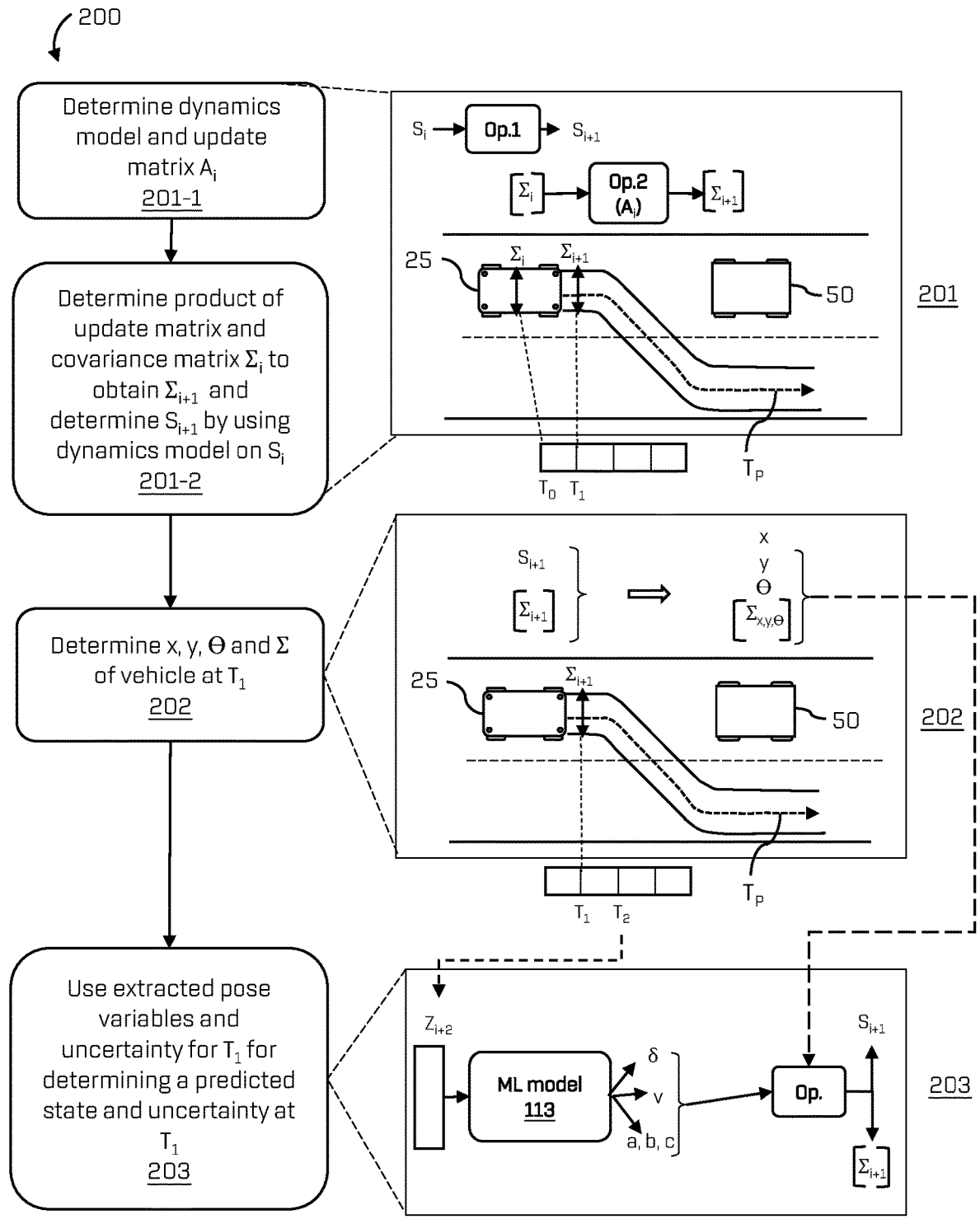
FIG. 2 depicts an example process of using an approximation in relation to a predicted state and associated uncertainty.

FIG. 2 depicts an example process 200 of using an approximation in relation to a predicted state and an associated uncertainty. Process 200 may be performed after step 105 of FIG. 1. In addition, process 200 provides more detail on how steps 104 and 105 of process 100 are performed in an autoregressive manner in relation to each of the time steps $T_{1-N}$ of a predicted trajectory.

To predict a future state and a related uncertainty metric for the vehicle 25 for a time in the future (a second time), an approximation may be made in relation to how one or more variables defining a state of the vehicle 25 at a current (first) time change over time. At step 201-1, a dynamics model may be determined and used to approximate how the state of the vehicle changes over time (in this example, from time $T_0$ to time $T_1$) and a linearized dynamics model may be used to approximate how the uncertainty of respective states changes over the same time period. That is, changes in dynamics relating to the state of the vehicle may be modelled with respect to time (using a dynamics model) and changes in the environment within which the vehicle operates may be outputted by an ML model, such as ML model 112 of the example of FIG. 1.

An approximation for an uncertainty associated with a state of a vehicle at a future time may also be determined at step 201-1, whereby the approximation may be a linearized version of a dynamics model used to approximate the change of the state of the vehicle over time, such as a Taylor linearization or the application of a Kalman filter. The linearized dynamics model may be converted into a matrix, update matrix $A_i$. The linearized dynamics model and hence the update matrix $A_i$ may be determined based at least in part on the outputs from the machine learned model 113 (in the example of FIG. 1, the outputs are the velocity and the steering angle), the predicted vehicle state $S_i$ at a first time (time step $T_0$), and the uncertainty $\Sigma_i$ associated with predicted vehicle state $S_i$ at the first time (determined in step 105 of process 100), and the dynamics model.

At step 201-2, a first operation (Op. 1) may be applied to the predicted state $S_i$ of the vehicle 100 at the first time $T_0$ to determine a predicted state $S_{i+1}$ of the vehicle 25 at the second time $T_1$. The predicted state $S_{i+1}$ may be determined by applying the first operation to the mean target velocity and the mean target steering angle determined at step 103 of FIG. 1, to the state $S_i$, and to either the dynamics model determined at step 201-1 that defines how one or more variables defining the state change over time (which may be identified and used as the basis for generating the update matrix $A_i$) or the update matrix $A_i$.

An example of the first operation is as follows:

$$S_{i+1} = A_i * S_i \qquad \text{Op.1}$$

In a variation to Op.1, non-linear dynamics may be applied directly to $S_i$ to determine $S_{i+1}$ rather than applying $A_i$. A second operation (Op.2) based on the update matrix $A_i$ is applied to the covariance matrix $Z_i$ to determine a product of the update matrix $A_i$ and the covariance matrix $\Sigma_i$ to obtain a (third) covariance matrix $\Sigma_{i+1}$ for the predicted state $S_{i+1}$. An example of the second operation is as follows:

$$A_i * \Sigma_i * A_i^T \qquad \text{Op.2}$$

where $A_i^T$ is a transpose of the update matrix $A_i$

The predicted states may be considered as predicted or target mean states of the vehicle 25 because they may be determined based on the mean target velocity and mean target steering angle determined at step 103 of FIG. 1.

In relation to the update matrix $A_i$, an example of how to generate $A_i$ from a dynamics model will now be described in relation to a)-e) below. In other examples, a different dynamics model may be used to generate the update matrix $A_i$, where the different dynamics model defines one or more relationships between different properties of the state of the vehicle.

a) F (s, u) is a general example of a dynamics model, where s is representative of a vehicle state and u represents the inputs. The following equations are specific examples of dynamics models defined in relation to a plurality of properties of the state of the vehicle:

b) dx/dt=v*cos (yaw)

c) dy/dt=v*sin (yaw)

d) dyaw/dt=yaw_rate where v and yaw_rate are determinable as inputs u from the predicted state $S_i$.

Equations b) and c) are non-linear in yaw due to their reliance on cosine and sine. Taylor linearization can be applied to determine an approximation that is accurate near the predicted state $S_i$:

e) $x(i+1)=x(k)+[v(k)*\cos(yaw(k))+\cos(yaw(k))*(v\_true(k)-v(k)-v(k))*\sin(yaw(k))*(yaw\_true(k)-yaw(k))]*dt$ In this example, equation e) is a linear approximation and is converted into a matrix, the update matrix $A_i$. The values v_true and yaw_true account for errors in the approximation. The update matrix $A_i$ is a 3×5 matrix. An example of the first row of the matrix $A_i$ is given below:

First row of $A_i$=[1,0,-v(k)*sin(yaw(k)), cos(yaw(k)), 0]

Referring back to FIG. 2, at step 202, one or more variables defining the predicted state $S_{i+1}$ of the vehicle 25 may be determined from the predicted state $S_{i+1}$. In the example of FIG. 2, the so-called pose variables may be determined from $S_{i+1}$, that is, the variables defining the positional characteristics of the vehicle 25, which may comprise: an x position, a y position, and a yaw angle, Θ (also referred to as orientation). In addition, an uncertainty metric $\Sigma_{x,y,\Theta}$ associated with the pose variables may be determined from the covariance matrix $\Sigma_{i+1}$. In an example, the covariance matrix $Z_{i+1}$ generated by Op.2 may be a 3×3 matrix that directly corresponds to the uncertainty matrix $\Sigma_{x,y,\Theta}$ associated with the pose variables.

At step 203, the extracted pose variables and the associated uncertainty metric may be propagated to be used in an operation (Op.) that was previously used to determine the predicted state $S_i$ of the vehicle 25 at $T_0$ and an associated uncertainty $\Sigma_i$ in a previous iteration of step 105 of FIG. 1. The operation (Op.) may use the propagated pose variables and the associated uncertainty metric (the positional uncertainties) in combination with a newly predicted target velocity, v, a newly predicted target steering angle, δ, and newly predicted covariance variables (the control uncertainties) derived by the ML model 113 based on an input of a predicted state $Z_{i+2}$ outputted by the ML model 112 (described in relation to FIG. 3).

As a result of the operation, a predicted state $S_{i+1}$ and an associated uncertainty $\Sigma_{i+1}$ for time step $T_1$ may be determined, which may have been previously approximated at step 201-2 of FIG. 2. Accordingly, the uncertainty relating to pose variables for a given time step may be based on the uncertainty $\Sigma_{x,y,\Theta}$ relating to the pose variables for a preceding time step, whereas the uncertainty relating to the control variables (velocity and steering angle) for a given time step may be determinable from the output of the ML component 113. In relation to a predicted state of the vehicle 25 at a given time step, the pose variables may be based on the (determined) pose variables of a predicted state for the preceding time step, whereas the control variables may be output by the ML component 113.

Figure 3:
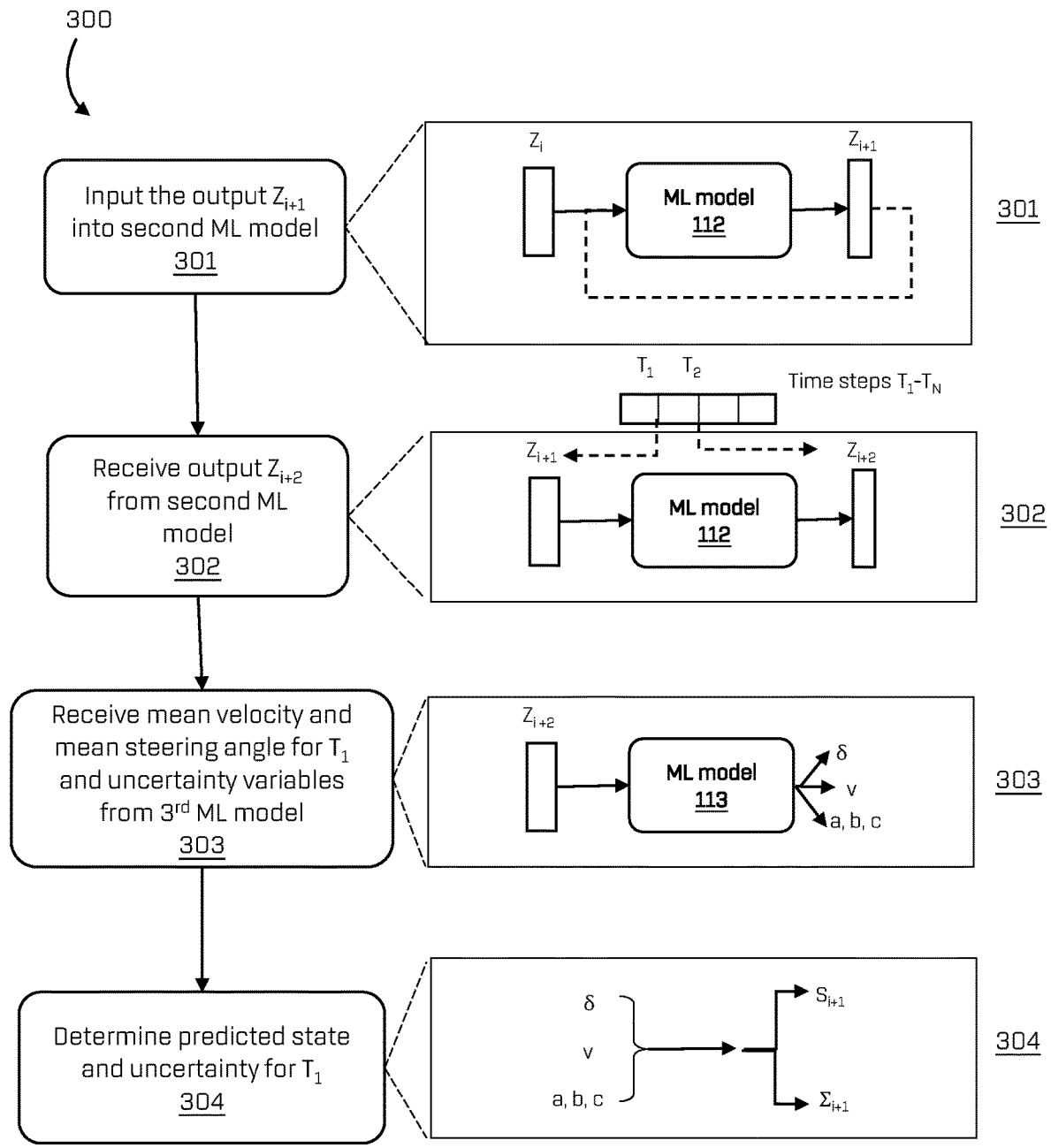
FIG. 3 depicts a further example process of using a machine learned model to predict a trajectory and associated uncertainty (ies) for an autonomous vehicle.

FIG. 3 depicts a further example process 300 of using the machine learning model 112 of FIG. 1 to predict a trajectory and associated uncertainty for an autonomous vehicle, such as vehicle 25. Process 300 may provide context to step 203 of FIG. 2 where a newly predicted target velocity, v, a newly predicted target steering angle, δ, and newly predicted covariance variables are derived by the ML model 113 based on the input of a predicted state $Z_{i+2}$ outputted by the ML model 112.

At step 301, the vector representation of the environment $Z_{i+1}$ at a future time $T_1$ (also referred to as a second time) output by the ML model 112 in a first iteration may be input to the ML model 112 as part of a second iteration in order for the ML model to output a vector representation of the environment at an additional future time, for example at a subsequent time step, $T_2$ (also referred to as a third time).

At step 302, a vector representation of the environment $Z_{i+2}$ at time step $T_2$ may be received from the second machine learned model 112.

At step 303, $Z_{i+2}$ may be input into the third machine learned model 113 and a second mean target velocity, v, a second mean target steering angle, δ, of the vehicle 25 at $T_1$ and a second plurality of uncertainty variables associated with the second mean target velocity and the second mean target steering angle may be received from the machine learned model 113.

At step 304, a determination of a predicted vehicle state at $T_1$ and an uncertainty associated with the predicted vehicle state at $T_1$ may be made based at least in part on the second mean target velocity, the second mean target steering angle and the second plurality of uncertainty variables.

As described in relation to step 203 of FIG. 2, the determination of the predicted vehicle state at $T_1$ and the associated uncertainty may also be based on pose variables and an associated pose uncertainty extracted from a prediction of the vehicle state at $T_1$ and associated uncertainty at $T_1$, determined in a preceding iteration, as described in relation to steps 201 and 202 of FIG. 2.

Figure 4:
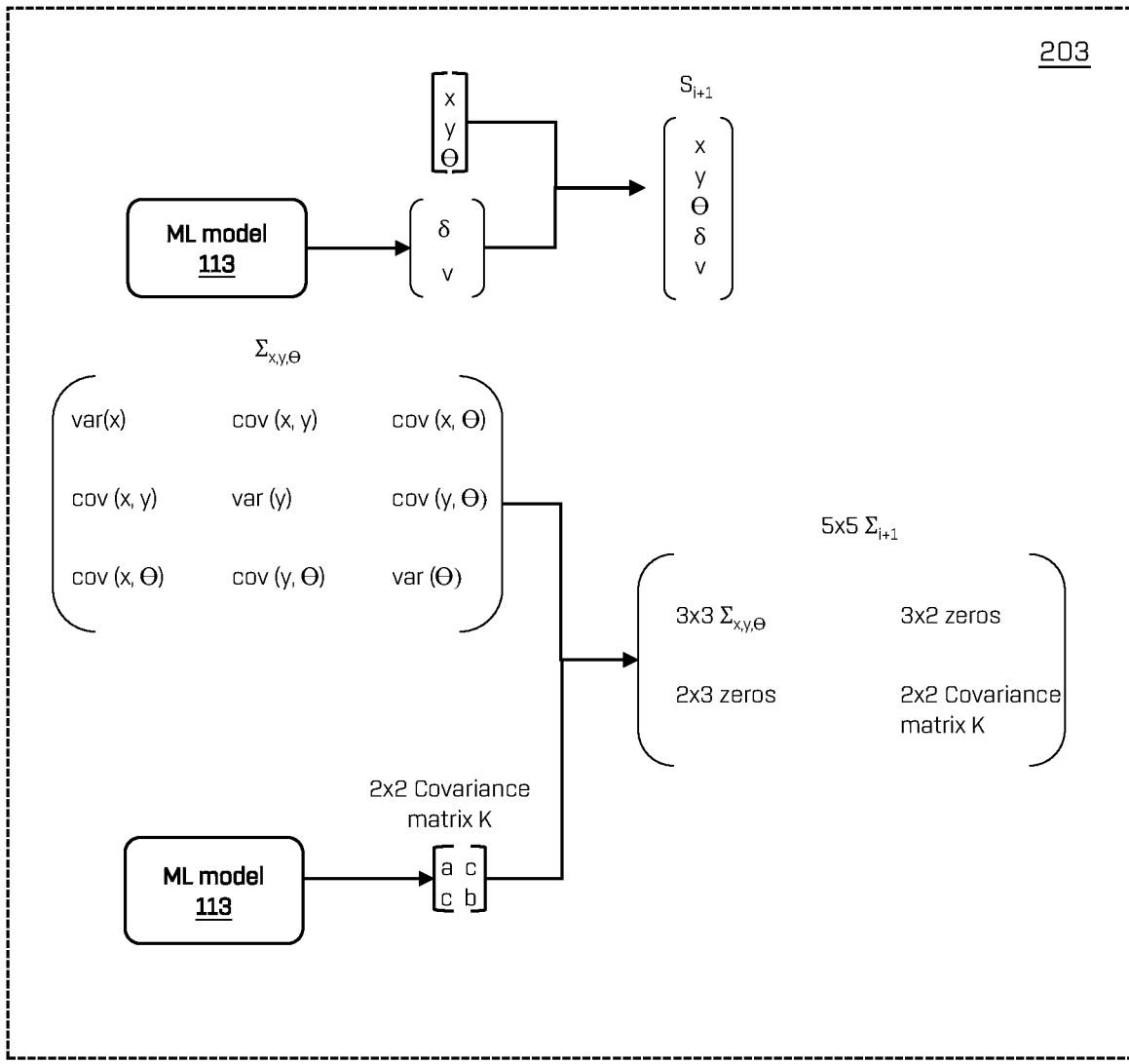
FIG. 4 depicts an example method of determining a mean state of a vehicle and an associated uncertainty for a given time step of a predicted trajectory.

FIG. 4 depicts an example method of determining a mean state of a vehicle, such as the vehicle 25, and an associated uncertainty for a given time step of a predicted trajectory. FIG. 4 provides more detail to step 203 of FIG. 2 and is also applicable to step 304 of FIG. 3.

As described in relation to steps 202 and 203 of FIG. 2, for a given time step, such as $T_1$, pose variables x, y, and Θ that were determined as part of a previous iteration based on a linear approximation of a predicted state of the vehicle 25 for a previous time step or time, such as $T_0$, may be used in combination with the control variables (velocity and steering angle) output by the ML model 113 to determine a predicted state for the vehicle 25 at the given time step, $T_1$. In the examples, the predicted pose variables may be concatenated with the control variable output by model 113 to provide predicted state $S_{i+1}$.

Similarly, for the given time step, an uncertainty metric $\Sigma_{x,y,\Theta}$ previously determined for the pose variables, may be used in combination with a covariance matrix K formed from covariance variables a, b, c output by the ML model 113 to determine an uncertainty metric $\Sigma_{i+1}$ associated with the vehicle state at $T_1$. In the example of FIG. 4, $\Sigma_{x,y,\Theta}$ is a 3×3 matrix because it defines the uncertainty relating to the three pose variables: x position, y position, and yaw angle (orientation). Matrix K is a 2×2 matrix because it defines the uncertainty relating to the two control variables: velocity and steering angle. Consequently, in this example, combining $\Sigma_{x,y,\Theta}$ and matrix K results in a 5×5 matrix $\Sigma_{i+1}$ containing each of $\Sigma_{x,y,\Theta}$ and matrix K and zeros in positions that are not filled by either of $\Sigma_{x,y,\Theta}$ and matrix K.

Figure 5:
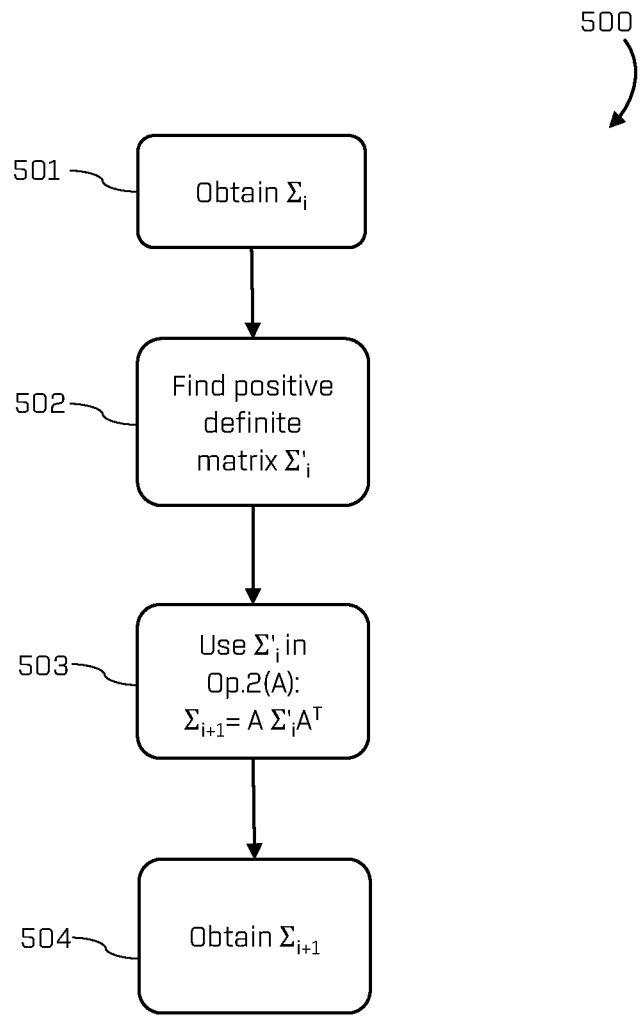
FIG. 5 is a flowchart depicting an example method of determining an uncertainty metric for a given time step of a predicted trajectory.

FIG. 5 is a flowchart depicting an example method 500 of determining an uncertainty metric associated with a state of a vehicle at a given time step of a predicted trajectory. Method 500 provides further detail to step 201-2 of FIG. 2 that applies a dynamics model to a mean state and applies an update matrix to the associated covariance matrix for a given time step to approximate the mean state and associated covariance matrix for the next time step. In some scenarios, a covariance matrix generated for a given time step may not be a valid covariance matrix and therefore may not be usable for determining a loss function for one or both ML models 112 and 113, for example, the covariance matrix may be singular and therefore not be a positive definite matrix. The method 500 provides a way of substituting an invalid covariance matrix with a valid covariance matrix to enable appropriate evaluation and modification of the ML models 112 and 113 in a training phase.

At step 501, an uncertainty metric $\Sigma_i$ may be obtained for a vehicle state at time step $T_1$ of the predicted trajectory. $\Sigma_i$ may be obtained using the processes described in relation to FIGS. 1-4.

At step 502, a positive definite matrix $\Sigma'_i$ may be found. For example, a constraint may be set on the uncertainty metric $\Sigma_{i+1}$ that it is a positive definite matrix, and it may be determined that $\Sigma_i$ does not meet the constraint and is therefore singular, also referred to as indefinite. An indefinite matrix is a matrix that is not able to be inverted and is unsuitable for determining a loss function for one or more of the ML models 112 and 113. $\Sigma'_i$ may be a matrix that is close to $\Sigma_i$ and meets the constraint and can therefore be inverted. In one example, identifying a "close" matrix may comprise identifying a nearest positive semi-definite or definite matrix according to Frobenius norm, whereby the difference between the Frobenius norm for $\Sigma_i$ and for $\Sigma'_i$ may be determined to be the smallest difference compared to other matrices. The Frobenius norm may be defined as the square root of the sum of the squares of the individual elements of the matrix in question. In an example where the identified matrix $\Sigma'_i$ is a semi-definite matrix (with eigenvalues that are >=0), an identity matrix (where all the elements of the principal diagonal are ones and all other elements are zeros) may be multiplied by a small number (sometimes referred to as epsilon) and added to $\Sigma'_i$ to make all the eigenvalues >0, which makes the matrix $\Sigma'_i$ a definite matrix.

At step 503, $\Sigma'_i$ may be used in place of $\Sigma_i$ in applying the second operation using the update matrix $A_i$ at step 201-2 of FIG. 2.

At step 504, $\Sigma_{i+1}$ may be obtained, resulting from the application of update matrix $A_i$ to $\Sigma'_i$.

Figure 6:
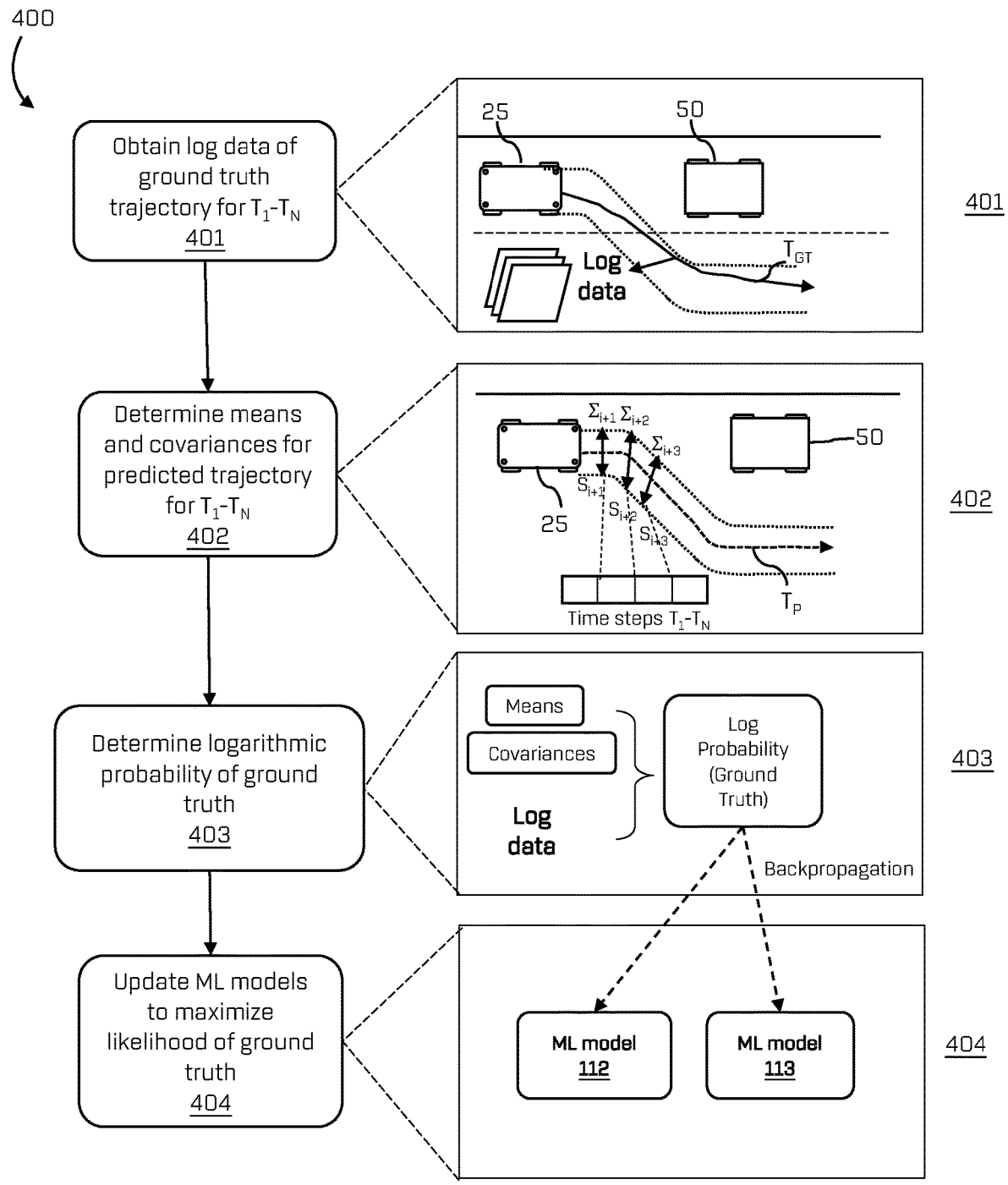
FIG. 6 depicts an example method of training a machine learned model to predict a trajectory and associated uncertainty for an autonomous vehicle.

FIG. 6 depicts an example method 400 of training a machine learned model, such as machine learned model 112 or 113, to predict a trajectory and associated uncertainty for an autonomous vehicle, such as the vehicle 25.

At step 401, log data of a ground truth trajectory of the vehicle 25 may be obtained. For example, the log data may be received at a remote computer system, such as computing device 1032 of FIG. 11. The ground truth trajectory may represent an approximation of one or more actual paths that the vehicle 25 traversed through the environment, for example, where more than one actual path of the vehicle is sampled for the ground truth, the ground truth trajectory may be representative of a pseudo-distribution of the number of sampled ground truth paths. In the example of FIG. 6, the ground truth trajectory $T_G$ is depicted as being different to the predicted trajectory, $T_P$ of step 402 but within the bounds (represented by upper and lower dashed lines) of the uncertainty distribution for the predicted trajectory.

At step 402, means and covariances for the predicted trajectory $T_P$ may be determined. For example, the means and covariances for the predicted trajectory $T_P$ may have been determined by the processes described in relation to FIGS. 1-5.

At step 403, a logarithmic probability of the ground truth trajectory may be determined. A loss value may also be determined for the covariance matrices City of the vehicle states at each time step $T_{1-N}$ using a loss function. As an example, the loss function may comprise at least one of a Least Absolute Deviations loss function (also referred to an L1 loss function or Absolute Error Loss function) and a Least Square Errors loss function (also referred to as an L2 loss function). For a given time step, the loss value may be representative of an error gap between the ground truth state of the vehicle and the predicted state of the vehicle, and, in some examples, the uncertainty distribution corresponding to the covariance matrix associated with the predicted state of the vehicle. A cumulative loss may be determined by combining the individual losses from the individual loss functions for time steps $T_{1-N}$. In some examples, a loss function may be weighted so that differences in earlier trajectory points (that is, at earlier time steps of a trajectory) are weighted more than the differences in the later trajectory points (that is, at later time steps in the trajectory) because, for example, the vehicle 25 may be configured to execute the ML models repeatedly for every iteration of trajectory prediction such that the ML models are more likely to execute the earlier trajectory points and less likely to execute the later trajectory points if and when those later points are superseded by an updated trajectory.

At step 404, the ML model 112 and the ML model 113 may be updated via a backpropagation technique to minimize the negative log likelihood of the ground truth trajectory by minimizing the cumulative loss from one or more loss functions. In some examples, the backpropagation technique may be used to maximize the likelihood of the predicted trajectory. As previously mentioned, further detail relating to an example backpropagation technique is provided below with reference to FIGS. 8B and 9. The updating of the ML models 112 and 113 results in a modified ML model 112 and a modified ML model 113. The modified ML models 112 and 113 may be provided to the vehicle 25 for use in controlling the autonomous vehicle 25. The modification via the backpropagation technique may involve reconfiguring nodes or layers of a given ML model and/or adjusting one or more weights therein to reduce the loss from the loss function, where the adjustments may be made to one or more weights, biases, and or activation functions associated with one or more neurons/nodes.

It should be noted that while the method of FIG. 6 is described in relation to the ML models 112 and 113, the method is also applicable and transferable to the ML model 111.

Coarse and Fine Step Techniques for Trajectory Prediction and Backpropagation

FIGS. 7-10 relate to coarse-step and fine-step trajectory prediction and backpropagation techniques, which may be implemented in conjunction with the trajectory prediction and backpropagation processes described in relation to FIGS. 1-6.

Figure 7:
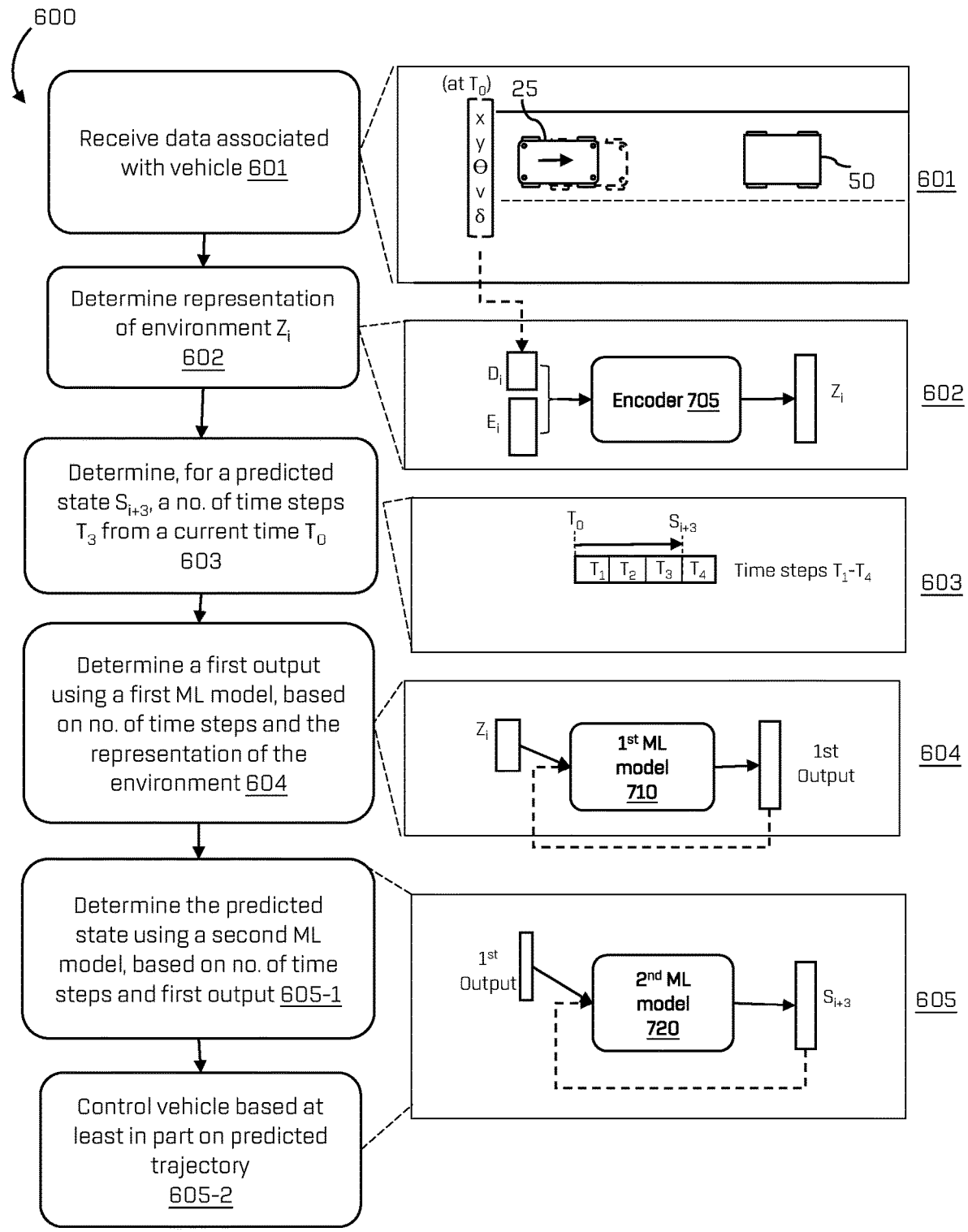
FIG. 7 depicts an example process of training a machine learned model to predict a trajectory for an autonomous vehicle using a coarse-step prediction technique and a fine-step prediction technique.

FIG. 7 depicts an example process 600 of training a machine learned model to generate a predicted trajectory for an autonomous vehicle using a coarse-step prediction technique and a fine-step prediction technique. In the example of FIG. 7, the predicted trajectory may comprise a plurality of predicted states associated with a plurality of respective time steps $T_1$-$T_4$. The coarse-step technique may determine a predicted state after a first number of time steps from a current time. The fine-step technique may determine a predicted state after a second number of time steps from a current time, where the second number of time steps is fewer than the first number of time steps such that the fine-step technique is used over a shorter period of time. Additionally or alternatively, the fine step technique may determine a predicted state after a second number of time steps after the first number of time steps associated with the coarse-step technique, whereby the coarse-step technique is used for a first section of the predicted trajectory and the fine-step technique is used for a second, later, and possibly smaller section of the predicted trajectory. In some examples, where a trajectory comprises a plurality of time steps, such as time steps $T_1$-$T_4$, the fine-step technique may be used on its own to generate multiple predicted states each corresponding to a point in time after one of the time steps $T_1$-$T_4$. The example of FIG. 7 provides a method 600 that may combine the coarse-step technique with the fine-step technique.

At step 601, data $D_i$ associated with the vehicle 25 traversing an environment may be received. As depicted in step 601, the environment comprises a stationary object 50 ahead of the vehicle 25.

Figure 11:
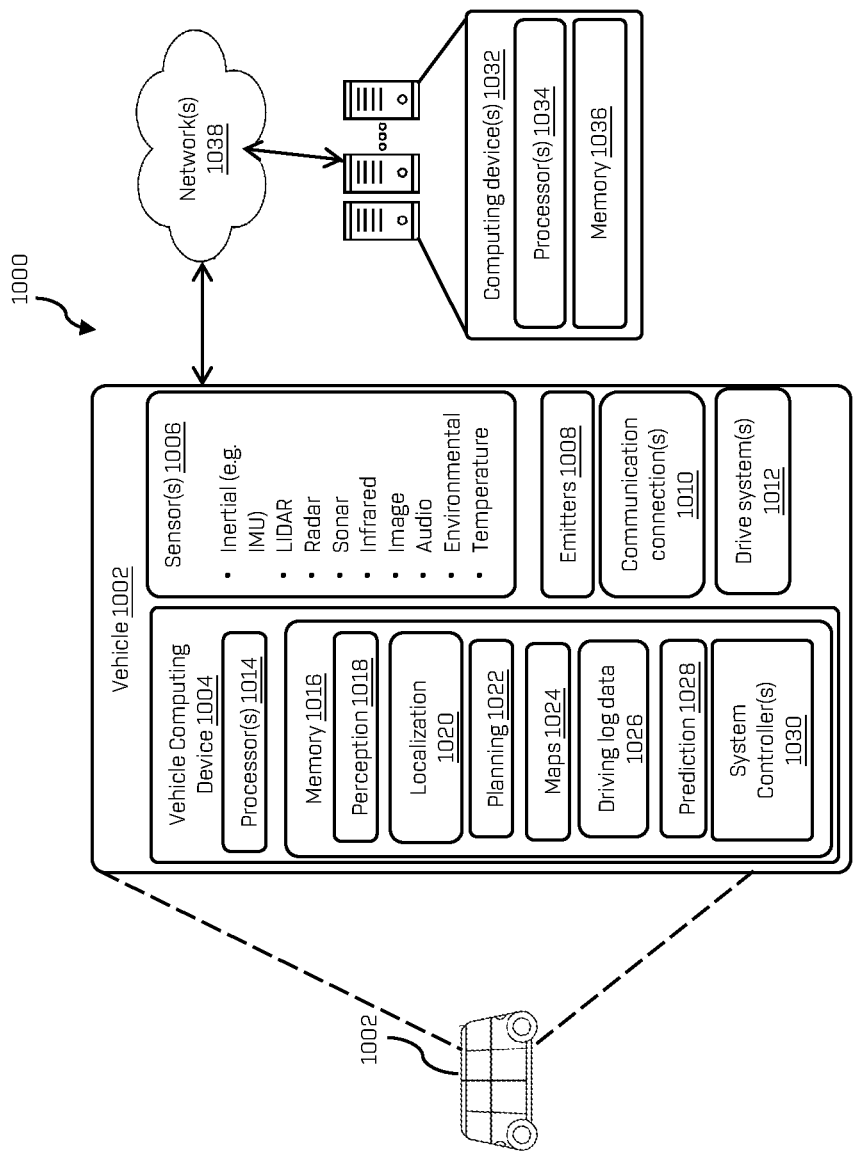
FIG. 11 is a block diagram of an example system for implementing the techniques described herein.

The data $D_i$ may be received at a remote computer system, located at a different location to that of the vehicle 25, such as computing device 1032 of FIG. 11. The data $D_i$ may be sensor data collected by a sensor system of the vehicle 25, for example, sensor system 1006 of FIG. 11, whereby the data $D_i$ is representative of the surroundings of the vehicle 25 in the environment and the relative positioning of the vehicle 25, and possibly the object 50, therein, such that a remote computer system can generate a representation of the vehicle 25 and display the representation on a display. Such a representation may comprise, for example, actual sensor data received from the vehicle or data derived therefrom (e.g., bounding boxes of other objects in the environment proximate the vehicle 100) which may be overlayed onto a map, or otherwise, in conjunction with any other representation (e.g., some combination of sensor data and representative data). In this way, the display may enable the vehicle 25 to be monitored in real-time as the vehicle 25 moves through the environment.

The data $D_i$ may be representative of a vehicle state $S_0$ at a current time $T_0$ and comprise one or more of a position, an orientation, a steering angle, a velocity, or an acceleration of the vehicle 25. In some cases, one or more properties of the vehicle may be derivable from the data associated with the vehicle 25.

At step 602, the data $D_i$ associated with the vehicle 25 and data $E_i$ associated with the environment may be input to an encoder 705. The encoder 705 may output a representation of the environment $Z_i$, which may be an initial (hence the "i" subscript) vector representation of the environment and state of the vehicle 25 at $T_0$.

At step 603, a number of time steps from a current time $T_0$ is determined for a predicted state $S_{i+3}$ of the vehicle 25. In the example of FIG. 7, the determined number of time steps is three time steps, $T_{1-3}$, between $T_0$ and predicted state $S_{i+3}$.

At step 604, a first machine learned model 710 may be used, based on the number of time steps, to determine a first output. Specifically, the representation of the environment $Z_i$ may be input to the first machine learned model 710 and the model 710 outputs the first output. The first output may be a coarse-step prediction of a state of the vehicle at a point in time between $T_0$ and $T_3$.

At step 605-1, the second ML model 720 may output a fine-step prediction of the state of the vehicle. For example, where the first output is representative of a state of the vehicle at a point in time closer to $T_3$ then to $T_0$, the remaining amount of time to $T_3$ is covered by a smaller step in time, the fine step. The second machine learned model 720 may be used to determine the predicted state $S_{i+3}$ of the vehicle 25 based on the number of time steps. Specifically, the first output may be input to the second machine learned model 720 and the model 720 may output the predicted state $S_{i+3}$. At step 605-2, the vehicle 25 may be controlled based on the predicted trajectory.

Steps 603-605 may be repeated for multiple predicted states of the predicted trajectory for the vehicle 25. For generating subsequent predicted states of the predicted trajectory, the first output of the first machine learned model 710 may be iteratively input to the first machine learned model 710 a first number of times (depicted by the dashed line in step 604). Similarly, the first output and the predicted state output by the second machine learned model 720 may be iteratively input to the second machine learned model 720 a second number of times (depicted by the dashed line in step 605), where the second number of times is different to the first number of times.

In this way, the first machine learned model 710 and the second machine learned model 720 may be applied in an autoregressive manner whereby the coarse-step state prediction (the first output) output from the model 710 is used as a target state that is input to the second model 720 for each fine-step prediction that the second model 720 generates, where the second input to the second model 720 is a previously predicted state by the model 720.

Figure 8A:
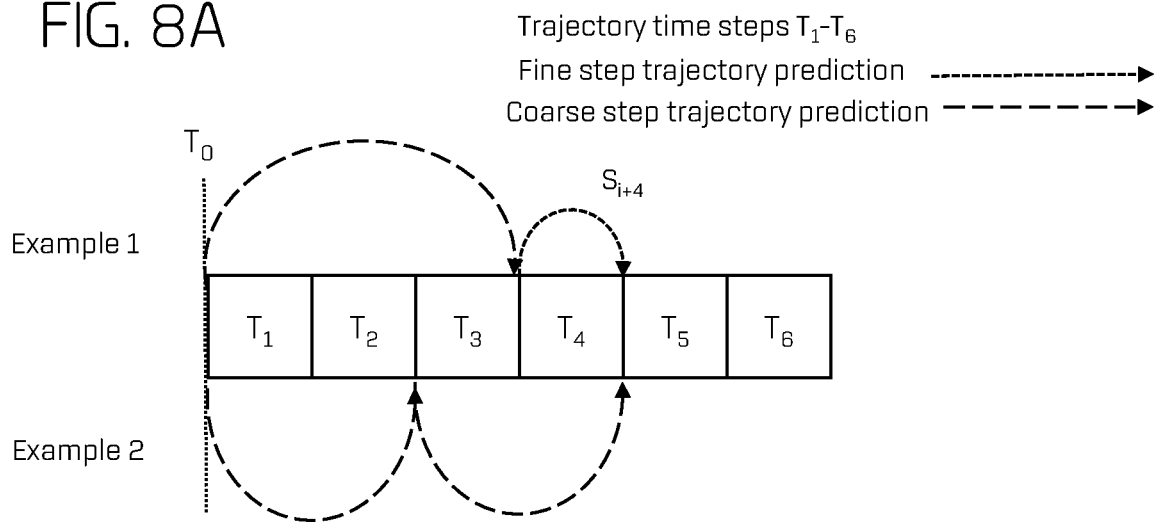
FIG. 8A depicts an example representation of a coarse-step trajectory prediction technique and a fine-step trajectory prediction technique.

FIG. 8A depicts two examples (labelled "Example 1" and "Example 2") of a coarse-step trajectory prediction technique and a fine-step trajectory prediction technique. The examples of FIG. 8A may be implemented by method 600 of FIG. 7.

As shown in FIG. 8A, to predict a state $S_{i+4}$ of the vehicle 25 at time step $T_4$, a coarse-step prediction technique (represented by wider dashed lines) may be used in combination with a fine-step prediction technique (represented by the smaller dashed lines). In particular, a number of time steps between the current time $T_0$ and time $T_4$ (associated with the predicted state in question) may be determined. In the example of FIG. 8A, the number of time steps is four. Based on the determined number of time steps, the coarse step prediction technique may be used to determine a predicted state of the vehicle 25 after the coarse-step, which, in Example 1 of FIG. 8A (depicted above the trajectory time steps), spans time steps $T_1$-$T_3$. The fine step prediction technique, which in the example of FIG. 8A spans a single time step, may then be used to determine the predicted state of the vehicle at time $T_4$, where the output of the coarse-technique (the predicted state of the vehicle at time $T_3$) may be used as an input to the fine-step technique. In this way, two prediction processes are performed in order to arrive at a predicted vehicle state at time $T_4$, rather than a prediction process being performed for each of the time steps $T_1$-$T_4$, which reduces the amount of computer processing resources required to generate a predicted trajectory.

In addition, a state prediction for a given portion of the predicted trajectory may not be dependent on a state prediction associated with a preceding portion. For example, the fine step technique may not be dependent on the predictions of previous fine step prediction techniques, which reduces the likelihood of error propagation. Generally, the coarse-step technique may require fewer computing resources to generate a predicted trajectory for a given amount of time compared to the fine-step technique because fewer predicted states are determined within the given amount of time. However, the fine-step technique may provide a more precise state prediction. In some examples, the fine-step technique may be implemented for a first portion of a trajectory and the coarse-step technique may be implemented for a second later portion of the trajectory. This may be advantageous as a more precise prediction is provided for the immediate future ahead of a first or current time whilst still providing a prediction for later time steps in an efficient way.

Looking at the alternative example shown in FIG. 8A and labelled as "Example 2" (depicted below the trajectory time steps), the coarse step has a different duration than that of Example in that it spans two time steps ($T_1$-$T_2$) rather than three ($T_1$-$T_3$). As a result, two successive coarse-step predictions may be performed to predict the state $S_{i+4}$, without performing a fine-step prediction. Whilst FIG. 8A depicts a first example of how to combine the coarse and fine step techniques and a second example of using the coarse step technique in isolation, there may be other ways to combine the coarse and fine step techniques, which may vary based on the amount of time between a current or first time and a time for which a predicted state is to be determined. In other examples, the fine-step prediction technique may be performed in isolation of the coarse step technique or in parallel to the coarse step technique.

As depicted, the coarse-step trajectory prediction technique may generate state predictions at an interval equivalent to multiple time steps, whereas the fine-step trajectory technique may generate state predictions at an interval equivalent to a single time step. Accordingly, the coarse-technique may generate fewer state predictions than the fine-step technique for a given period of time of a trajectory and thereby be associated with a lower frequency than the fine step technique because a coarse step covers a greater amount of time than a fine step. For example, the coarse-step technique may operate at a frequency of 5 Hz and the fine-step technique may operate at a frequency of 1 Hz. In some examples, a coarse-step may be 200 milliseconds in duration and a fine-step may be 50 milliseconds in duration.

In examples, the duration of a coarse-step and the duration of a fine-step may vary between each iteration of a trajectory prediction. In addition, for a given trajectory prediction iteration there may be multiple coarse-steps of different duration and multiple fine-steps of different duration used in combination for generating a predicted trajectory.

Figure 8B:
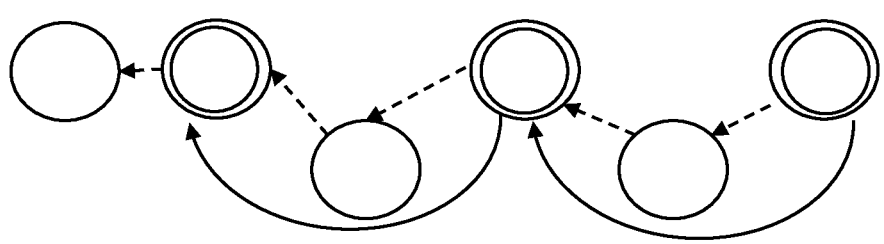
FIG. 8B depicts an example representation of a coarse-step backpropagation technique and a fine-step backpropagation technique.

A coarse-step technique and a fine-step technique may also be implemented in isolation or in combination in relation to backpropagation as part of the training of a machine learned model. FIG. 8B depicts an example of a combined coarse-step and fine-step backpropagation technique for a plurality of nodes of a machine learned model, such as model 720, where a coarse path P1 (solid line) and a fine path P2 (dashed line) are implemented. The coarse path P1 may not move through every node. In the example of FIG. 8B, path P1 misses out every other node (depicted by the single edged nodes). In this way, coarse path P1 may provide a quicker route through the nodes, whereby gradients backpropagated via P1 are not changed by each node of the model 720, which may reduce the computing resources required for the backpropagation. The fine path P2 may move through every node of the model and so would require more frequent changes to a backpropagated gradient. As described in relation to trajectory prediction in FIG. 7, the coarse and fine backpropagation techniques can be combined and implemented successively, in parallel, or with at least some overlap.

Figure 9:
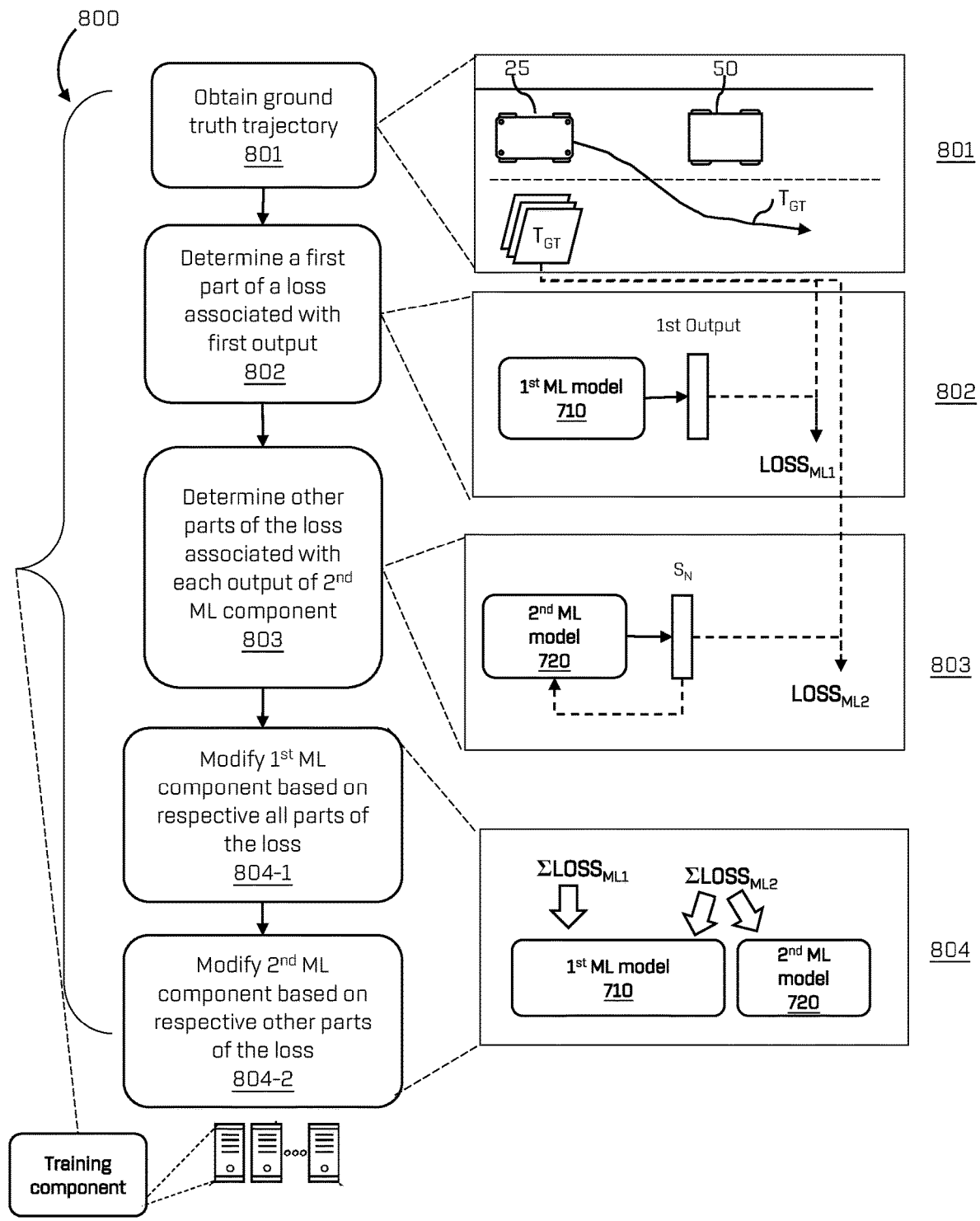
FIG. 9 depicts an example process of training a machine learned model to predict a trajectory using a coarse-step trajectory prediction technique and a fine-step trajectory prediction technique and corresponding backpropagation techniques.

FIG. 9 depicts an example process 800 of training a machine learned model, such as one or both of the machine learned models 710 and 720, to predict a trajectory using a coarse-step trajectory prediction technique and a fine-step trajectory prediction technique and corresponding backpropagation techniques. Process 800 may be implemented by a training component, for example, a training component of a remote computer system such as computing device 1032 of FIG. 11.

At step 801, a ground truth trajectory Tor of the autonomous vehicle 25 through the environment may be obtained.

At step 802, a first part of a loss, $LOSS_{ML1}$, associated with the first output of the first ML model 710 may be determined. The first part of the loss may be determined by a loss function, such as an L1 loss function or an L2 loss function described in relation to FIG. 6. The first part of the loss may be representative of a set of first differences between the predicted trajectory, or states thereof, and a first subset of the ground truth trajectory. In some examples, a set of gradients may be determined based on the set of first differences.

At step 803, a plurality of other parts of the loss, $LOSS_{ML2}$, may be determined, for example, by use of a loss function as referenced above. Each of the other parts is associated with a respective predicted state output by the second ML model 720 for a respective time step of the predicted trajectory. The other parts of the loss may be representative of a set of second differences between the predicted trajectory, or states thereof, and a second subset of the ground truth trajectory. In some examples, a set of additional gradients may be determined based on the set of second differences.

Steps 802 and 803 may be repeated for each time step of the predicted trajectory.

At step 804-1, the first ML model 710 may be modified based on the respective first parts of the loss, thereby generating a modified first machine learning component. For example, gradients derived from the differences associated with the respective first parts of the loss may be backpropagated through the first ML model 710.

At step 804-2, the second ML model 720 may be modified based on the respective plurality of other parts of the loss, thereby generating a modified second machine learning component. For example, the additional gradients derived from the differences associated with the respective other parts of the loss, whereby a derivative of a gradient associated with a respective time step is used to determine a gradient associated with a preceding time step, may be backpropagated through the second machine learned model 720.

In the example of FIG. 9, the first ML model 710 may be modified based on all parts of the determined loss ($LOSS_{ML1}$ and $LOSS_{ML2}$), whereas the second ML model may be modified based on a subset of the loss ($LOSS_{ML2}$).

In some examples, the first and second ML models 710 and 720 may be trained end-to-end, whereby gradients (determined based on the loss functions associated with the second model 720) are backpropagated through the second ML model 720 and the first ML model 710. In this way, the first and second ML models 710 and 720 may be trained simultaneously.

Figure 10:
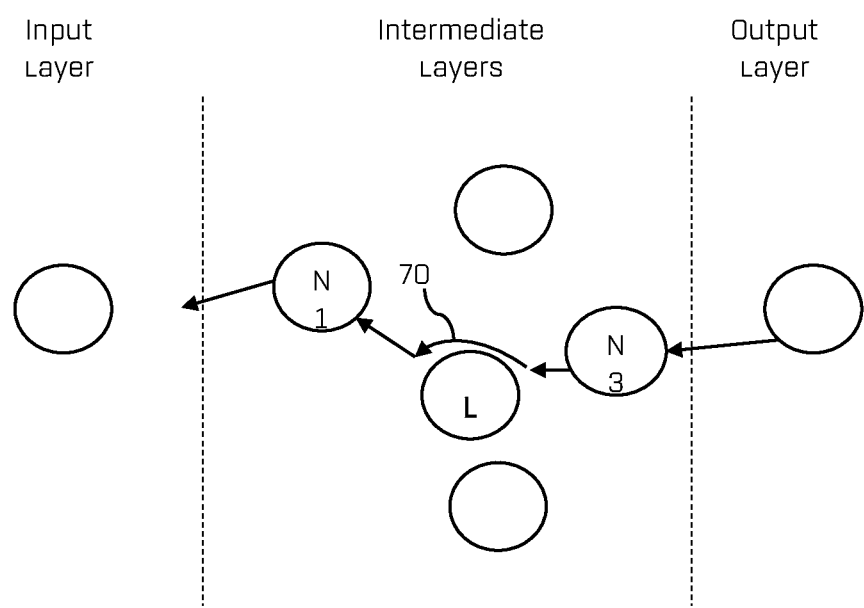
FIG. 10 is an illustration of a further backpropagation technique for training a machine learned model.

FIG. 10 is an illustration of a further backpropagation technique for training a machine learned model. FIG. 10 depicts a subset of nodes within a machine learned model, such as machine learned model 720. In the example of FIG. 10, there is a single input node depicted in an input layer section, a plurality of nodes depicted in an intermediate layers section, and a single output node depicted in the output layer section. The arrows symbolize the direction of a backpropagation process being implemented with respect to the machine learned model, where the process may start at the output layer and progress to the input layer via the intermediate layers.

In the example of FIG. 10, the backpropagation process may progress within the intermediate layers from a node N3 to a node N1 via an intermediate node L. As illustrated, the process may advance from N3 to N1 via node L by a skip connection 70. The skip connection 70 symbolizes that the function of node L, which for simplicity is referred to as function L(x), is not interrogated as part of the backpropagation process. Accordingly, a gradient backpropagated from N3 to N1 may remain unchanged, for example because it has not been exposed to the L(x), which would have caused an increase or a decrease to the gradient. As a result of skipping a node (and its function), the number of calls through the machine learned model to implement the backpropagation process may be reduced, which is useful in the context of the disclosure given the autoregressive nature of the machine learned model 720. Although the example of FIG. 10 contains a single skip connection 70, in other examples, a machine learned model may comprise a plurality of skip connections.

Overall System

FIG. 11 is a block diagram illustrating an example system 1000 for implementing some of the various technologies described herein, such as the techniques, processes and methods described in relation to FIGS. 1-10. In some examples, the system 1000 may include one or multiple features, components, and/or functionality of examples described herein with reference to other figures.

The system 1000 may include a vehicle 1002. In some examples, the vehicle 1002 may include some or all of the features, components, and/or functionality described above with respect to the example vehicle 25. As shown in FIG. 11, the vehicle 1002 may also include a vehicle computing device 1004, one or more sensor systems 1006, one or more emitters 1008, one or more network interfaces or communication connections 1010, and one or more drive systems 1012.

The vehicle computing device 1004 can, in some examples, include one or more processors 1014 and memory 1016 communicatively coupled with the one or more processors 1014. In the illustrated example, the vehicle 1002 is an autonomous vehicle; however, the vehicle 1002 could be any other type of vehicle (e.g., automobile, truck, bus, aircraft, watercraft, train, etc.), or any other system having components such as those illustrated in FIG. 11. In examples, the one or more processors 1014 may execute instructions stored in the memory 1016 to perform one or more operations on behalf of the one or more vehicle computing devices 1004.

The memory 1016 of the one or more vehicle computing devices 1004 can store a perception component 1018, a localization component 1020, a planning component 1022, a map(s) component 1024, driving log data 1026, a prediction component 1028, and one or more system controllers 1030. Though depicted in FIG. 11 as residing in memory 1016 for illustrative purposes, it is contemplated that the perception component 1018, the localization component 1020, the planning component 1022, the map(s) component 1024, the log data 1026, the prediction component 1028, and/or the one or more system controllers 1030 can additionally, or alternatively, be accessible to the vehicle 1002 (e.g., stored on, or otherwise accessible from, memory remote from the vehicle 1002, such as memory 1036 of one or more computing devices 1032, such as the teleoperator computing system 210 of FIG. 1).

In at least one example, the localization component 1020 can include functionality to receive data from the sensor system(s) 1006 to determine a position and/or orientation of the vehicle 1002 (e.g., one or more of an x-, y-, z-position, roll, pitch, or yaw). For example, the localization component 1020 can include and/or request/receive a map of an environment and can continuously determine a location and/or orientation of the autonomous vehicle within the map. In some instances, the localization component 1020 can utilize SLAM (simultaneous localization and mapping), CLAMS (calibration, localization and mapping, simultaneously), relative SLAM, bundle adjustment, non-linear least squares optimization, or the like based on image data, lidar data, radar data, IMU data, GPS data, wheel encoder data, and the like captured by the one or more sensor systems 1006 or received from one or more other devices (e.g., computing devices 1036) to accurately determine a location of the autonomous vehicle 1002. In some instances, the localization component 1020 can provide data to various components of the vehicle 1002 to determine an initial position of the autonomous vehicle 1002 for generating a trajectory and/or for determining to retrieve map data. In various examples, the localization component 1020 can provide data to a web-based application that may generate a data visualization associated with the vehicle 1002 based at least in part on the data.

In some instances, the perception component 1018 can include functionality to perform object tracking, detection, segmentation, and/or classification. In some examples, the perception component 1018 can provide processed sensor data that indicates a presence of an entity that is proximate to the vehicle 1002 and/or a classification of the entity as an entity type (e.g., car, pedestrian, cyclist, animal, building, tree, road surface, curb, sidewalk, unknown, etc.). In additional and/or alternative examples, the perception component 1018 can provide processed sensor data that indicates one or more characteristics associated with a detected entity (e.g., a tracked object) and/or the environment in which the entity is positioned. In some examples, characteristics associated with an entity can include, but are not limited to, an x-position (global and/or local position), a y-position (global and/or local position), a z-position (global and/or local position), an orientation (e.g., a roll, pitch, yaw), an entity type (e.g., a classification), a velocity of the entity, an acceleration of the entity, an extent of the entity (size), etc. Characteristics associated with the environment can include, but are not limited to, a presence of another entity in the environment, a state of another entity in the environment, a time of day, a day of a week, a season, a weather condition, an indication of darkness/light, etc. In some instances, the perception component 1018 may provide data to a web-based application that generates a data visualization associated with the vehicle 1002 based at least in part on the data.

In general, the planning component 1022 can determine a trajectory (sometimes referred to as a planned trajectory or path) for the vehicle 1002 to follow to traverse through an environment. For example, the planning component 1022 can determine various routes and trajectories and various levels of detail. For example, the planning component 1024 can determine a route to travel from a first location (e.g., a current location) to a second location (e.g., a target location). For the purpose of this discussion, a route can be a sequence of waypoints for travelling between two locations. As examples, waypoints may include streets, intersections, global positioning system (GPS) coordinates, etc. Further, the planning component 1024 can generate an instruction for guiding the autonomous vehicle along at least a portion of the route from the first location to the second location. In at least one example, the planning component 1024 can determine how to guide the autonomous vehicle from a first waypoint in the sequence of waypoints to a second waypoint in the sequence of waypoints. In some examples, the instruction can be a trajectory, or a portion of a trajectory. In some examples, multiple trajectories can be substantially simultaneously generated (e.g., within technical tolerances) in accordance with a receding horizon technique, wherein one of the multiple trajectories is selected for the vehicle 1002 to navigate.

In at least one example, the vehicle computing device 1004 can include one or more system controllers 1030, which can be configured to control steering, propulsion, braking, safety, emitters, communication, components, and other systems of the vehicle 1002. These system controller(s) 1030 can communicate with and/or control corresponding systems of the drive assembly(s) or system 1012 and/or other components of the vehicle 1002.

The memory 1016 can further include the map(s) component 1024 to maintain and/or update one or more maps (not shown) that can be used by the vehicle 1002 to navigate within the environment. For the purpose of this discussion, a map can be any number of data structures modeled in two dimensions, three dimensions, or N-dimensions that are capable of providing information about an environment, such as, but not limited to, topologies (such as intersections), streets, mountain ranges, roads, terrain, and the environment in general. In some instances, a map can include, but is not limited to: texture information (e.g., color information (e.g., RGB color information, Lab color information, HSV/HSL color information), and the like), intensity information (e.g., lidar information, radar information, and the like); spatial information (e.g., image data projected onto a mesh, individual "surfels" (e.g., polygons associated with individual color and/or intensity)), reflectivity information (e.g., specularity information, retroreflectivity information, BRDF information, BSSRDF information, and the like). In one example, a map can include a three-dimensional mesh of the environment. In some instances, the map can be stored in a tiled format, such that individual tiles of the map represent a discrete portion of an environment and can be loaded into working memory as needed. In at least one example, the one or more maps can include at least one map (e.g., images and/or a mesh). In some examples, the vehicle 1002 can be controlled based at least in part on the maps. That is, the maps can be used in connection with the localization component 1020, the perception component 1018, and/or the planning component 1022 to determine a location of the vehicle 1002, identify objects in an environment, and/or generate routes and/or trajectories to navigate within an environment. Additionally, the maps can be used in connection with the web-based application to generate content associated with the vehicle 1002, such as a data visualization.

In some examples, the one or more maps can be stored on a remote computing device(s) (such as the computing device(s) 1032) accessible via one or more network(s) 1038. In some examples, multiple maps can be stored based on, for example, a characteristic (e.g., type of entity, time of day, day of week, season of the year, etc.). Storing multiple maps can have similar memory requirements but increase the speed at which data in a map can be accessed.

The memory 1016 may also store log data 1026 associated with the vehicle. For instance, the log data 1026 may include one or more of diagnostic messages, notes, routes, etc. associated with the vehicle. By way of example, if information associated with a notification (e.g., diagnostic message) that is presented on a system interface of the user interface is copied and saved, the information may be stored in the log data 1026.

In some instances, aspects of some or all of the memory-stored components discussed herein can include any models, algorithms, and/or machine learning algorithms. For example, in some instances, components in the memory 1016 (and the memory 1036, discussed in further detail below) such as the localization component 1020, the perception component 1018, and/or the planning component 1022 can be implemented as a neural network.

As described herein, an exemplary neural network is a biologically inspired algorithm which passes input data through a series of connected layers to produce an output. Each layer in a neural network can also comprise another neural network or can comprise any number of layers (whether convolutional or not). As can be understood in the context of this disclosure, a neural network can utilize machine learning, which can refer to a broad class of such algorithms in which an output is generated based on learned parameters.

Although discussed in the context of neural networks, any type of machine learning can be used consistent with this disclosure. For example, machine learning algorithms can include, but are not limited to, regression algorithms (e.g., ordinary least squares regression (OLSR), linear regression, logistic regression, stepwise regression, multivariate adaptive regression splines (MARS), locally estimated scatterplot smoothing (LOESS)), instance-based algorithms (e.g., ridge regression, least absolute shrinkage and selection operator (LASSO), elastic net, least-angle regression (LARS)), decisions tree algorithms (e.g., classification and regression tree (CART), iterative dichotomiser 3 (ID3), Chi-squared automatic interaction detection (CHAID), decision stump, conditional decision trees), Bayesian algorithms (e.g., naïve Bayes, Gaussian naïve Bayes, multinomial naïve Bayes, average one-dependence estimators (AODE), Bayesian belief network (BNN), Bayesian networks), clustering algorithms (e.g., k-means, k-medians, expectation maximization (EM), hierarchical clustering), association rule learning algorithms (e.g., perceptron, back-propagation, hopfield network, Radial Basis Function Network (RBFN)), deep learning algorithms (e.g., Deep Boltzmann Machine (DBM), Deep Belief Networks (DBN), Convolutional Neural Network (CNN), Stacked Auto-Encoders), Dimensionality Reduction Algorithms (e.g., Principal Component Analysis (PCA), Principal Component Regression (PCR), Partial Least Squares Regression (PLSR), Sammon Mapping, Multidimensional Scaling (MDS), Projection Pursuit, Linear Discriminant Analysis (LDA), Mixture Discriminant Analysis (MDA), Quadratic Discriminant Analysis (QDA), Flexible Discriminant Analysis (FDA)), Ensemble Algorithms (e.g., Boosting, Bootstrapped Aggregation (Bagging), AdaBoost, Stacked Generalization (blending), Gradient Boosting Machines (GBM), Gradient Boosted Regression Trees (GBRT), Random Forest), SVM (support vector machine), supervised learning, unsupervised learning, semi-supervised learning, etc. Additional examples of architectures include neural networks such as ResNet50, ResNet101, VGG, DenseNet, PointNet, and the like.

In at least one example, the sensor system(s) 1006 can include lidar sensors, radar sensors, ultrasonic transducers, sonar sensors, location sensors (e.g., GPS, compass, etc.), inertial sensors (e.g., inertial measurement units (IMUs), accelerometers, magnetometers, gyroscopes, etc.), image sensors (e.g., camera, RGB, IR, intensity, depth, etc.), audio sensors (e.g., microphones), wheel encoders, environment sensors (e.g., temperature sensors, humidity sensors, light sensors, pressure sensors, etc.), temperature sensors (e.g., for measuring temperatures of vehicle components), etc. The sensor system(s) 1006 can include multiple instances of each of these or other types of sensors. For instance, the lidar sensors can include individual lidar sensors located at the corners, front, back, sides, and/or top of the vehicle 1002. As another example, the image sensors can include multiple image sensors disposed at various locations about the exterior and/or interior of the vehicle 1002. As an even further example, the audio sensors can include multiple audio sensors disposed at various locations about the exterior and/or interior of the vehicle 1002. Additionally, the audio sensors can include an array of a plurality of audio sensors for determining directionality of audio data. The sensor system(s) 1006 can provide input to the vehicle computing device 1004. Additionally, or alternatively, the sensor system(s) 1006 can send sensor data, via the one or more networks 1038, to the one or more computing device(s) 1032 at a particular frequency, after a lapse of a predetermined period of time, in near real-time, etc.

The vehicle 1002 can also include one or more emitters 1008 for emitting light and/or sound. The emitters 1008 in this example include interior audio and visual emitters to communicate with occupants of the vehicle 1002. By way of example, interior emitters can include speakers, lights, signs, display screens, touch screens, haptic emitters (e.g., vibration and/or force feedback), mechanical actuators (e.g., seatbelt tensioners, seat positioners, headrest positioners, etc.), and the like. The emitters 1008 in this example also include exterior emitters. By way of example, the exterior emitters in this example include lights to signal a direction of travel or other indicator of vehicle action (e.g., indicator lights, signs, light arrays, etc.), and one or more audio emitters (e.g., speakers, speaker arrays, horns, etc.) to audibly communicate with pedestrians or other nearby vehicles, one or more of which comprising acoustic beam steering technology.

The vehicle 1002 can also include one or more communication connection(s) 1010 that enable communication between the vehicle 1002 and one or more other local or remote computing device(s). For instance, the communication connection(s) 1010 can facilitate communication with other local computing device(s) on the vehicle 1002 and/or the drive system(s) 1014. Also, the communication connection(s) 1010 can allow the vehicle 1002 to communicate with other nearby computing device(s) (e.g., other nearby vehicles, traffic signals, laptop computer etc.). The communications connection(s) 1010 also enable the vehicle 1002 to communicate with a remote teleoperations system or other remote services.

The communications connection(s) 1010 can include physical and/or logical interfaces for connecting the vehicle computing device(s) 1004 to another computing device (e.g., computing device(s) 1032) and/or a network, such as network(s) 1038. For example, the communications connection(s) 1010 can enable Wi-Fi-based communication such as via frequencies defined by the IEEE 1002.11 standards, short range wireless frequencies such as Bluetooth®, cellular communication (e.g., 2G, 3G, 4G, 4G LTE, 5G, etc.) or any suitable wired or wireless communications protocol that enables the respective computing device to interface with the other computing device(s).

In at least one example, a direct connection (not shown) of vehicle 1002 can provide a physical interface to couple the one or more drive system(s) 1012 with the body of the vehicle 1002. For example, the direct connection can allow the transfer of energy, fluids, air, data, etc. between the drive system(s) 1012 and the vehicle 1002. In some instances, the direct connection can further releasably secure the drive system(s) 1012 to the body of the vehicle 1002.

In at least one example, the vehicle 1002 can include one or more drive systems 1012. In some examples, the vehicle 1002 can have a single drive assembly 1012. In at least one example, if the vehicle 1002 has multiple drive systems 1012, individual drive systems 1014 can be positioned on opposite longitudinal ends of the vehicle 1002 (e.g., the leading and trailing ends, the front, and the rear, etc.).

The drive system(s) 1012 can include many of the vehicle systems and/or components, including a high voltage battery, a motor to propel the vehicle, an inverter to convert direct current from the battery into alternating current for use by other vehicle systems, a steering system including a steering motor and steering rack (which can be electric), a braking system including hydraulic or electric actuators, a suspension system including hydraulic and/or pneumatic components, a stability control system for distributing brake forces to mitigate loss of traction and maintain control, an HVAC system, lighting (e.g., lighting such as head/tail lights to illuminate an exterior surrounding of the vehicle), and one or more other systems (e.g., cooling system, safety systems, onboard charging system, other electrical components such as a DC/DC converter, a high voltage junction, a high voltage cable, charging system, charge port, etc.). Additionally, the drive system(s) 1014 can include one or more drive system controllers which can receive and preprocess data from the sensor system(s) and to control operation of the various vehicle systems. In some examples, the drive system controller(s) can include one or more processors and memory communicatively coupled with the one or more processors. The memory can store one or more systems to perform various functionalities of the drive system(s) 1012. Furthermore, the drive assembly(s) 1012 may also include one or more communication connection(s) that enable communication by the respective drive assembly with one or more other local or remote computing device(s).

The computing device(s) 1032 can include one or more processors 1034, a memory 1036 that may be communicatively coupled to the one or more processors 1034, and software 1031 stored by the memory 1036. In some examples, the computing device(s) 1032 may be associated with a teleoperations system that remotely monitors a fleet of vehicles. In such an example, the software 1031 may comprise the various software components of the teleoperator computing system. Additionally, or alternatively, the computing devices(s) 1032 may be leveraged by the tele-operations system to receive and/or process data on behalf of the teleoperations system.

The processor(s) 1014 of the vehicle 1002 and the processor(s) 1034 of the computing device(s) 1032 can be any suitable processor capable of executing instructions to process data and perform operations as described herein. By way of example and not limitation, the processor(s) 1014 and 1034 can comprise one or more Central Processing Units (CPUs), Graphics Processing Units (GPUs), or any other device or portion of a device that processes electronic data to transform that electronic data into other electronic data that can be stored in registers and/or memory. In some examples, integrated circuits (e.g., ASICs, etc.), gate arrays (e.g., FPGAs, etc.), and other hardware devices can also be considered processors in so far as they are configured to implement encoded instructions.

Memory 1016 and 1036 are examples of non-transitory computer-readable media. The memory 1016 and 1036 can store an operating system and one or more software applications, components, instructions, programs, and/or data to implement the methods described herein and the functions attributed to the various systems. In various implementations, the memory can be implemented using any suitable memory technology, such as static random-access memory (SRAM), synchronous dynamic RAM (SDRAM), nonvolatile/Flash-type memory, or any other type of memory capable of storing information. The architectures, systems, and individual elements described herein can include many other logical, programmatic, and physical components, of which those shown in the accompanying figures are merely examples that are related to the discussion herein.

As can be understood, the components of the vehicle 1002 of FIG. 11 are described herein as divided for illustrative purposes. However, the operations performed by the various components can be combined or performed in any other component. It should be noted that while FIG. 11 is illustrated as a distributed system, in alternative examples, components of the vehicle 1002 can be associated with the computing device(s) 1032 and/or components of the computing device(s) 1032 can be associated with the vehicle 1002. That is, the vehicle 1002 can perform one or more of the functions associated with the computing device(s) 1032, and vice versa.

Training

The machine learned models described in relation to FIGS. 1-11 may be trained using training data. The training data may be input to one or more of the models. The output(s) generated by the one or more models (based on the training data) may be compared to an expected or observed output(s) that occurred based on data corresponding to the inputted training data (sometimes referred to as ground truth data). In examples, a machine learned model may be provided with an input (for example, data representative of a first state of a vehicle) and configured to generate an output (for example, data representative of a second state of a vehicle at a future time), where the output is compared to an expected or observed vehicle state at the future time. The input data may be in vector form. Similarly, an output generated by a machine learned model may be in vector form.

The training data used in the training of the machine learned may comprise ground truth trajectory data representative of a vehicle state of an autonomous vehicle and data representative of a representation of an environment being traversed by the autonomous vehicle, for one or more points in time. The training data may be obtained or extracted from historical log data associated with a real-world autonomous vehicle operating within a real-world driving environment or a simulated autonomous vehicle operating within a simulated driving environment. The historical log data may comprise raw sensor data gathered by one or more sensors of one or more autonomous vehicles. Alternatively, the training data may not be based on log data and instead be fabricated yet realistic data, such that the training data comprises data defining a fabricated trajectory that was calculated based on one or more properties of the vehicle and one or more properties of the environment.

The training may be performed by one or more training components of one or more computing devices, such as computing devices 1032 of FIG. 11. The training data may be stored in memory of an autonomous vehicle, such as driving log data 1026 of FIG. 11, and/or in memory 1036 of computing device 1032 of FIG. 11.

In some examples, the training data may be provided with labels such that the machine learned models may be trained using supervised training. Alternatively, the machine learned models may be trained using reinforcement learning, and, in particular, imitation learning.

The machine learned models describes in relation to FIGS. 1-11 may be trained simultaneously in an end-to-end framework whereby gradients are backpropagated through all of the machine learned models.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

The components described herein represent instructions that may be stored in any type of computer-readable medium and may be implemented in software and/or hardware. All of the methods and processes described above may be embodied in, and fully automated via, software code components and/or computer-executable instructions executed by one or more computers or processors, hardware, or some combination thereof. Some or all of the methods may alternatively be embodied in specialized computer hardware.

At least some of the processes discussed herein are illustrated as logical flow graphs, each operation of which represents a sequence of operations that can be implemented in hardware, software, or a combination thereof. In the context of software, the operations represent computer-executable instructions stored on one or more non-transitory computer-readable storage media that, when executed by one or more processors, cause a computer or autonomous vehicle to perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

Conditional language such as, among others, "may," "could," "may" or "might," unless specifically stated otherwise, are understood within the context to present that certain examples include, while other examples do not include, certain features, elements and/or steps. Thus, such conditional language is not generally intended to imply that certain features, elements and/or steps are in any way required for one or more examples or that one or more examples necessarily include logic for deciding, with or without user input or prompting, whether certain features, elements and/or steps are included or are to be performed in any particular example.

Conjunctive language such as the phrase "at least one of X. Y or Z." unless specifically stated otherwise, is to be understood to present that an item, term, etc. may be either X, Y, or Z, or any combination thereof, including multiples of each element. Unless explicitly described as singular, "a" means singular and plural.

Any routine descriptions, elements or blocks in the flow diagrams described herein and/or depicted in the attached figures should be understood as potentially representing modules, segments, or portions of code that include one or more computer-executable instructions for implementing specific logical functions or elements in the routine. Alternate implementations are included within the scope of the examples described herein in which elements or functions may be deleted or executed out of order from that shown or discussed, including substantially synchronously, in reverse order, with additional operations, or omitting operations, depending on the functionality involved as would be understood by those skilled in the art. Note that the term substantially may indicate a range. For example, substantially simultaneously may indicate that two activities occur within a time range of each other, substantially a same dimension may indicate that two elements have dimensions within a range of each other, and/or the like.

Many variations and modifications may be made to the above-described examples, the elements of which are to be understood as being among other acceptable examples. All such modifications and variations are intended to be included herein within the scope of this disclosure and protected by the following claims.

Example Clauses

A: A system comprising: one or more processors; and one or more computer-readable media storing computer executable instructions that, when executed, cause the one or more processors to perform operations comprising: receiving data associated with an autonomous vehicle traversing an environment; determining, based at least in part on the data, a representation of the environment; generating, as a predicted trajectory for the autonomous vehicle, a plurality of predicted states of the autonomous vehicle based at least in part on: determining, for a predicted state of the plurality of predicted states, a number of time steps from a current time; determining, based at least in part on the number of times steps, the representation of the environment, and using a first machine learned model, a first output; and determining, based at least in part on the number of time steps, the first output, and using a second machine learned model, the predicted state; and controlling the autonomous vehicle based at least in part on the predicted trajectory.

B: The system as described in clause A, wherein determining the first output comprises iteratively inputting an output of the first machine learned model into the first machine learned model a first number of times, and wherein determining the predicted state comprises iteratively inputting the first output and an output of the second machine learned model into the second machine learned model a second number of times different than the first number of times.

C: The system as described in clause A and clause B, wherein the first machine learned model is trained based at least in part on: determining a set of first differences between the predicted trajectory and a first subset of a ground truth trajectory; and modifying the first machine learned model based on the set of first differences, wherein the second machine learned model is trained based at least in part on: determining a set of second differences between the predicted trajectory and a second subset of the ground truth trajectory; and modifying the second machine learned model based on the set of second differences.

D: The system as described in clauses A to C, wherein the first machine model and the second machine model are trained based at least in part on: determining a set of losses between the predicted trajectory and a ground truth trajectory; modifying the first machine learned model based on the set of losses; and modifying the second machine learned based on a subset of the set of losses.

E: The system as described in clauses A to D, wherein the first machine learned model is trained based on a first subset of a ground truth trajectory and the second machine learned model is trained based on a second subset of the ground truth trajectory, wherein the second subset is after the first subset, and the first subset is associated with a greater frequency than the second subset.

F: The system as described in clauses A to E, wherein the operations comprise: determining, based at least in part on a set of first differences between the predicted trajectory and a ground truth trajectory, a first set of gradients; backpropagating the gradients through the first machine learned model; determining, based at least in part on a set of second differences between the predicted trajectory and the ground truth trajectory, a set of additional gradients; and backpropagating the plurality of additional gradients through the second machine learned model.

G: A method comprising: receiving data associated with an object traversing an environment; generating, as a predicted trajectory for the object, a plurality of predicted states of the object based at least in part on: determining, for a predicted state of the plurality of predicted states, an amount of time from a first time; using a first machine learned model to determine, based at least in part on the data associated with the object and the amount of time from the first time, a first output; and using a second machine learned model to determine, based at least in part on the amount of time from the first time and the first output, the predicted state of the object; and controlling the object based at least in part on the predicted trajectory.

H: The method as described in clause G, wherein the first machine learned model is associated with a first number of time steps and the second machine learned model is associated with a second number of time steps less than the first number, the method further comprising: iteratively inputting the first output of the first machine learned model into the first machine learned model a first number of times based at least in part on the first number of time steps; and iteratively inputting the predicted state of the object of the second machine learned model into the second machine learned model a second number of times based at least in part on the second number of time steps.

I: The method as described in clauses G and H, comprising: determining a number of first time steps associated with the amount of time from the first time; and determining a number of second time steps associated with the amount of time from the first time; wherein a first time step of the number of first time steps is equivalent to a greater amount of time than a second time step of the number of second time steps and further wherein a sum of the number of first time steps and the number of second time steps is equal to the amount of time from the first time; and iteratively inputting an output of the first machine learned model into the first machine learned model in accordance with the number of first time steps; and iteratively inputting an output of the second machine learned model into the second machine learned model in accordance with the number of second time steps.

J: The method as described in clauses G to I, comprising: determining a set of first differences between the predicted trajectory and a first subset of a ground truth trajectory; modifying the first machine learned model based on the set of first differences; determining a set of second differences between the predicted trajectory and a second subset of the ground truth trajectory; and modifying the second machine learned model based on the set of second differences.

K: The method as described in clauses G to J, comprising: determining a set of losses between the predicted trajectory and a ground truth trajectory; modifying the first machine learned model based on the set of losses; and modifying the second machine learned based on a subset of the set of losses.

L: The method as described in clauses G to K, comprising: determining one or more gradients based on a loss function associated with the first machine learned model; backpropagating the one or more gradients through the first machine learned model; determining one or more gradients based on a loss function associated with the second machine learned model; and backpropagating the one or more gradients through the second machine learned model.

M: The method as described in clauses G to L, comprising: using a third machine learned model to determine, based on the data and a predicted state of the object, a predicted velocity of the object, a predicted steering angle of the object, and one or more uncertainty variables relating to the predicted velocity and the predicted steering angle; and determining an uncertainty metric for the predicted state of the object based on the one or more uncertainty variables.

N: One or more non-transitory computer-readable media storing instructions executable by one or more processors, wherein the instructions, when executed, cause the one or more processors to perform operations comprising: receiving data associated with an object traversing an environment; generating, as a predicted trajectory for the object, a plurality of predicted states of the object based at least in part on: determining, for a predicted state of the plurality of predicted states, an amount of time from a first time; using a first machine learned model to determine, based at least in part on the data associated with the object and the amount of time from the first time, a first output; and using a second machine learned model to determine, based at least in part on the amount of time from the first time and the first output, the predicted state of the object; and controlling the object based at least in part on the predicted trajectory.

O: The non-transitory computer-readable media described in clause N, wherein the first machine learned model is associated with a first number of time steps and the second machine learned model is associated with a second number of time steps less than the first number, the operations further comprising: iteratively inputting an output of the first machine learned model into the first machine learned model a first number of times based at least in part on the first number of time steps; and iteratively inputting an output of the second machine learned model into the second machine learned model a second number of times based at least in part on the second number of time steps.

P: The non-transitory computer-readable media described in clauses N and O, wherein the operations further comprise: determining a number of first time steps associated with the amount of time from the first time; and determining a number of second time steps associated with the amount of time from the first time; wherein a first time step of the number of first time steps is equivalent to a greater amount of time than a second time step of the number of second time steps and further wherein a sum of the number of first time steps and the number of second time steps is equal to the amount of time from the first time; and iteratively inputting an output of the first machine learned model into the first machine learned model in accordance with the number of first time steps; iteratively inputting an output of the second machine learned model into the second machine learned model in accordance with the number of second time steps.

Q: The non-transitory computer-readable media described in clauses N to P, wherein the operations further comprise: determining a set of first differences between the predicted trajectory and a first subset of a ground truth trajectory; modifying the first machine learned model based on the set of first differences; determining a set of second differences between the predicted trajectory and a second subset of the ground truth trajectory; and modifying the second machine learned model based on the set of second differences.

R: The non-transitory computer-readable media described in clauses N to Q, wherein the operations further comprise: determining a set of losses between the predicted trajectory and a ground truth trajectory; modifying the first machine learned model based on the set of losses; and modifying the second machine learned based on a subset of the set of losses.

S: The non-transitory computer-readable media described in clauses N to R, wherein the operations further comprise: determining one or more gradients based on a loss function associated with the first machine learned model; backpropagating the one or more gradients through the first machine learned model; determining one or more gradients based on a loss function associated with the second machine learned model; and backpropagating the one or more gradients through the second machine learned model.

T: The non-transitory computer-readable media described in clauses N to S, wherein the operations further comprise: using a third machine learned model to determine, based on the data and a predicted state of the object, a predicted velocity of the object, a predicted steering angle of the object, and one or more uncertainty variables relating to the predicted velocity and the predicted steering angle; and determining an uncertainty metric for the predicted state of the object based on the one or more uncertainty variables.

Example Clauses

A1: A system comprising: one or more processors; and one or more computer-readable media storing computer executable instructions that, when executed, cause the one or more processors to perform operations comprising: receiving data associated with an autonomous vehicle traversing an environment; determining, based at least in part on the data, a representation of the environment; generating, as a predicted trajectory for the autonomous vehicle, a plurality of predicted states of the autonomous vehicle based at least in part on: determining, for a predicted state of the plurality of predicted states, a number of time steps from a current time; determining, based at least in part on the number of times steps, the representation of the environment, and using a first machine learned model, a first output; and determining, based at least in part on the number of time steps, the first output, and using a second machine learned model, the predicted state; and controlling the autonomous vehicle based at least in part on the predicted trajectory.

B1: The system described in clause A1, wherein determining the first output comprises iteratively inputting an output of the first machine learned model into the first machine learned model a first number of times, and wherein determining the predicted state comprises iteratively inputting the first output and an output of the second machine learned model into the second machine learned model a second number of times different than the first number of times.

C1: The system described in clauses A1 and B1, wherein the first machine learned model is trained based at least in part on: determining a set of first differences between the predicted trajectory and a first subset of a ground truth trajectory; and modifying the first machine learned model based on the set of first differences, wherein the second machine learned model is trained based at least in part on: determining a set of second differences between the predicted trajectory and a second subset of the ground truth trajectory; and modifying the second machine learned model based on the set of second differences.

D1: The system described in clauses A1 to C1, wherein the first machine model and the second machine model are trained based at least in part on: determining a set of losses between the predicted trajectory and a ground truth trajectory; modifying the first machine learned model based on the set of losses; and modifying the second machine learned based on a subset of the set of losses.

E1: The system as described in clauses A1 to D1, wherein the first machine learned model is trained based on a first subset of a ground truth trajectory and the second machine learned model is trained based on a second subset of the ground truth trajectory, wherein the second subset is after the first subset, and the first subset is associated with a greater frequency than the second subset.

F1: The system as described in clauses A1 to E1, wherein the operations comprise: determining, based at least in part on a set of first differences between the predicted trajectory and a ground truth trajectory, a first set of gradients; backpropagating the gradients through the first machine learned model; determining, based at least in part on a set of second differences between the predicted trajectory and the ground truth trajectory, a set of additional gradients; and backpropagating the plurality of additional gradients through the second machine learned model.

G1: A method comprising: receiving data associated with an object traversing an environment; generating, as a predicted trajectory for the object, a plurality of predicted states of the object based at least in part on: determining, for a predicted state of the plurality of predicted states, an amount of time from a first time; using a first machine learned model to determine, based at least in part on the data associated with the object and the amount of time from the first time, a first output; and using a second machine learned model to determine, based at least in part on the amount of time from the first time and the first output, the predicted state of the object; and controlling the object based at least in part on the predicted trajectory.

H1: The method described in clause G1, wherein the first machine learned model is associated with a first number of time steps and the second machine learned model is associated with a second number of time steps less than the first number, the method further comprising: iteratively inputting the first output of the first machine learned model into the first machine learned model a first number of times based at least in part on the first number of time steps; and iteratively inputting the predicted state of the object of the second machine learned model into the second machine learned model a second number of times based at least in part on the second number of time steps.

I1: The method described in clauses G1 and H1, comprising: determining a number of first time steps associated with the amount of time from the first time; and determining a number of second time steps associated with the amount of time from the first time; wherein a first time step of the number of first time steps is equivalent to a greater amount of time than a second time step of the number of second time steps and further wherein a sum of the number of first time steps and the number of second time steps is equal to the amount of time from the first time; and iteratively inputting an output of the first machine learned model into the first machine learned model in accordance with the number of first time steps; and iteratively inputting an output of the second machine learned model into the second machine learned model in accordance with the number of second time steps.

J1: The method described in clauses G1 to I1, comprising: determining a set of first differences between the predicted trajectory and a first subset of a ground truth trajectory; modifying the first machine learned model based on the set of first differences; determining a set of second differences between the predicted trajectory and a second subset of the ground truth trajectory; and modifying the second machine learned model based on the set of second differences.

K1: The method described in clauses G1 to J1, comprising: determining a set of losses between the predicted trajectory and a ground truth trajectory; modifying the first machine learned model based on the set of losses; and modifying the second machine learned based on a subset of the set of losses.

L1: The method described in clauses G1 to K1, comprising: determining one or more gradients based on a loss function associated with the first machine learned model; backpropagating the one or more gradients through the first machine learned model; determining one or more gradients based on a loss function associated with the second machine learned model; and backpropagating the one or more gradients through the second machine learned model.

M1: The method described in clauses G1 to L1, comprising: using a third machine learned model to determine, based on the data and a predicted state of the object, a predicted velocity of the object, a predicted steering angle of the object, and one or more uncertainty variables relating to the predicted velocity and the predicted steering angle; and determining an uncertainty metric for the predicted state of the object based on the one or more uncertainty variables.

N1: One or more non-transitory computer-readable media storing instructions executable by one or more processors, wherein the instructions, when executed, cause the one or more processors to perform operations comprising: receiving data associated with an object traversing an environment; generating, as a predicted trajectory for the object, a plurality of predicted states of the object based at least in part on: determining, for a predicted state of the plurality of predicted states, an amount of time from a first time; using a first machine learned model to determine, based at least in part on the data associated with the object and the amount of time from the first time, a first output; and using a second machine learned model to determine, based at least in part on the amount of time from the first time and the first output, the predicted state of the object; and controlling the object based at least in part on the predicted trajectory.

O1: The non-transitory computer-readable media described in clause N1, wherein the first machine learned model is associated with a first number of time steps and the second machine learned model is associated with a second number of time steps less than the first number, the operations further comprising: iteratively inputting an output of the first machine learned model into the first machine learned model a first number of times based at least in part on the first number of time steps; and iteratively inputting an output of the second machine learned model into the second machine learned model a second number of times based at least in part on the second number of time steps.

P1: The non-transitory computer-readable media described in clauses N1 and O1, wherein the operations further comprise: determining a number of first time steps associated with the amount of time from the first time; and determining a number of second time steps associated with the amount of time from the first time; wherein a first time step of the number of first time steps is equivalent to a greater amount of time than a second time step of the number of second time steps and further wherein a sum of the number of first time steps and the number of second time steps is equal to the amount of time from the first time; and iteratively inputting an output of the first machine learned model into the first machine learned model in accordance with the number of first time steps; iteratively inputting an output of the second machine learned model into the second machine learned model in accordance with the number of second time steps.

Q1: The non-transitory computer-readable media described in clauses N1 to P1, wherein the operations further comprise: determining a set of first differences between the predicted trajectory and a first subset of a ground truth trajectory; modifying the first machine learned model based on the set of first differences; determining a set of second differences between the predicted trajectory and a second subset of the ground truth trajectory; and modifying the second machine learned model based on the set of second differences.

R1: The non-transitory computer-readable media described in clauses N1 to Q1, wherein the operations further comprise: determining a set of losses between the predicted trajectory and a ground truth trajectory; modifying the first machine learned model based on the set of losses; and modifying the second machine learned based on a subset of the set of losses.

S1: The non-transitory computer-readable media described in clauses N1 to R1 wherein the operations further comprise: determining one or more gradients based on a loss function associated with the first machine learned model; backpropagating the one or more gradients through the first machine learned model; determining one or more gradients based on a loss function associated with the second machine learned model; and backpropagating the one or more gradients through the second machine learned model.

$T_1$: The non-transitory computer-readable media described in clauses N1 to S1, wherein the operations further comprise: using a third machine learned model to determine, based on the data and a predicted state of the object, a predicted velocity of the object, a predicted steering angle of the object, and one or more uncertainty variables relating to the predicted velocity and the predicted steering angle; and determining an uncertainty metric for the predicted state of the object based on the one or more uncertainty variables.

While the example clauses described above are described with respect to one particular implementation, it should be understood that, in the context of this document, the content of the example clauses can also be implemented via a method, device, system, computer-readable medium, and/or another implementation. Additionally, any of examples A-T and A1-T1 may be implemented alone or in combination with any other one or more of the examples A-T and A1-T1.

What is claimed is:

1. A system comprising:
one or more processors; and
one or more computer-readable media storing computer executable instructions that, when executed, cause the one or more processors to perform operations comprising:
receiving, as a vehicle state, one or more of a position, orientation, velocity, or steering angle of an autonomous vehicle traversing an environment;
inputting a representation of the environment and the vehicle state into a first machine learned model;
receiving, from the first machine learned model, a first vector representation of the environment at a first time;
inputting the first vector representation into a second machine learned model;
receiving, from the second machine learned model, a first output comprising a second vector representation of the environment at a second time, wherein the second time is after the first time;
inputting the second vector representation into a third machine learned model;
receiving, from the third machine learned model, a mean target velocity and a mean target steering angle of the vehicle at the first time and a plurality of uncertainty variables associated with the mean target velocity and the mean target steering angle;
determining, based at least in part on the mean target velocity and the mean target steering angle and the plurality of uncertainty variables, a predicted vehicle state at the first time and a first uncertainty associated with the predicted vehicle state at the first time; and
controlling the vehicle based at least in part on the predicted vehicle state at the first time and the first uncertainty associated with the predicted vehicle state at the first time.

2. The system of claim 1, wherein the operations further comprise:
determining, based at least in part on the predicted vehicle state at the first time, the associated first uncertainty and a dynamics model, an update matrix;
determining, based on the dynamics model, a predicted vehicle state at the second time; and
determining, as a second uncertainty associated with the predicted vehicle state at the second time, a product of the update matrix and the first uncertainty associated with the predicted vehicle state at the first time.

3. The system of claim 1, wherein the operations further comprise:
determining, based on the predicted vehicle state at the first time and the associated first uncertainty, a predicted vehicle state and associated second uncertainty at the second time;
determining, based at least in part on the predicted vehicle state at the second time, a position and an orientation of the vehicle at the second time;
determining, based at least in part on the second uncertainty associated with the predicted vehicle state at the second time, a third uncertainty associated with the position and the orientation of the vehicle at the second time; and
using the position, the orientation and the associated third uncertainty at the second time in combination with a second mean target velocity and a second mean target steering angle of the vehicle at the second time and a plurality of uncertainty variables associated with the second mean target velocity and the second mean target steering angle in determining a predicted vehicle state at the second time and a fourth uncertainty associated with the predicted vehicle state at the second time.

4. The system of claim 1, wherein the operations further comprise:
inputting the second vector representation of the environment at the second time into the second machine learned model;
receiving, from the second machine learned model, a second output comprising a third vector representation of the environment at a third time, wherein the third time is after the second time;
inputting the third vector representation of the environment at the third time into the third machine learned model;
receiving, from the third machine learned model, a second mean target velocity and a second mean target steering angle of the vehicle at the second time and a second plurality of uncertainty variables associated with the second mean velocity and the second mean steering angle;
determining, based at least in part on the second mean target velocity and the second mean target steering angle and the second plurality of uncertainty variables, a predicted vehicle state at the second time and an associated fourth uncertainty.

5. The system of claim 1, wherein the operations further comprise:
determining a first matrix corresponding to the first uncertainty associated with the predicted vehicle state at the first time;
determining that the first matrix is singular; and
identifying an invertible matrix to replace the first matrix.

6. A method comprising:
determining a first vector representation of an environment proximate a vehicle at a first time;
inputting, into a first machine learned model, the first vector representation of the environment;
receiving, from the first machine learned model, an output comprising a second vector representation of the environment at a second time, where the second time is subsequent to the first time; and
determining, based on the second vector representation, a predicted vehicle state at the first time and a first uncertainty associated with the predicted vehicle state at the first time.

7. The method of claim 6, wherein determining the predicted vehicle state at the first time and the first uncertainty associated with the predicted vehicle state at the first time comprises:
inputting, into a second machine learned model, the second vector representation;
receiving, from the second machine learned model, a second output comprising a velocity and a steering angle associated with the vehicle at the first time and a plurality of uncertainty variables associated with the velocity and the steering angle;
determining the predicted vehicle state at the first time and the first uncertainty associated with the predicted vehicle state at the first time based at least in part on the second output, a position and an orientation of the vehicle at the first time, and a second uncertainty associated with the position and the orientation of the vehicle at the first time.

8. The method of claim 6, further comprising:
determining, based at least in part on the predicted vehicle state and the associated first uncertainty at the first time, an update matrix;
determining, based at least in part on a dynamics model, a predicted vehicle state at the second time; and
determining, as a third uncertainty associated with the predicted vehicle state at the second time, a product of the update matrix and the first uncertainty associated with the predicted vehicle state at the first time.

9. The method of claim 6, further comprising:
determining, based on the predicted vehicle state at the first time and the first uncertainty associated with the predicted vehicle state at the first time, a predicted vehicle state and a third uncertainty associated with the predicted vehicle state at the second time;
determining a position and an orientation of the vehicle at the second time from the predicted vehicle state at the second time; and
determining a fourth uncertainty associated with the position and the orientation of the vehicle at the second time based at least in part on the third uncertainty associated with the predicted vehicle state at the second time.

10. The method of claim 6, further comprising:
inputting the second vector representation of the environment at the second time to the first machine learned model;
receiving, from the first machine learned model, a second output comprising a third vector representation of the environment at a third time; and
determining a predicted vehicle state at the third time and a fifth uncertainty associated with the predicted vehicle state at the third time based at least in part on:
the third vector representation,
a position and an orientation of the vehicle determined for the third time, and
a sixth uncertainty associated with the position and the orientation of the vehicle determined for the third time.

11. The method of claim 6, wherein the first uncertainty associated with the predicted vehicle state at the first time is a first covariance matrix and the method further comprises:
determining that the first covariance matrix is singular; and
identifying a second covariance matrix to replace the first covariance matrix, wherein the second covariance matrix is an invertible matrix.

12. The method of claim 6, wherein the first machine learned model is trained based at least in part on determining a difference between a ground truth trajectory of the vehicle recorded in log data and the predicted vehicle state at the first time and the first uncertainty associated with the predicted vehicle state at the first time to determine one or more differences and modifying a parameter of the first machine learned model based at least in part on the one or more differences.

13. One or more non-transitory computer-readable media storing instructions executable by one or more processors, wherein the instructions, when executed, cause the one or more processors to perform operations comprising:
determining, a first vector representation of an environment proximate a vehicle at a first time;
inputting, into a first machine learned model, the first vector representation of the environment;
receiving, from the first machine learned model, an output comprising a second vector representation of the environment at a second time, where the second time is subsequent to the first time; and determining, based on the second vector representation, a predicted vehicle state at the first time and a first uncertainty associated with the predicted vehicle state at the first time.

14. The non-transitory computer-readable media of claim 13, wherein the operations further comprise:
   inputting, into a second machine learned model, the second vector representation;
   receiving, from the second machine learned model, a second output comprising a velocity and a steering angle associated with the vehicle at the first time and a plurality of uncertainty variables associated with the velocity and the steering angle;
   determining the predicted vehicle state at the first time and a first uncertainty associated with the predicted vehicle state at the first time based at least in part on: the second output, a position and an orientation of the vehicle at the first time, and a second uncertainty associated with the position and the orientation of the vehicle at the first time.

15. The non-transitory computer-readable media of claim 13, wherein the operations further comprise:
   determining, based at least in part on the predicted vehicle state and the first uncertainty associated with the predicted vehicle state at the first time, an update matrix;
   determining, based at least in part on a dynamics model, a predicted vehicle state at the second time; and
   determining, as a third uncertainty associated with the predicted vehicle state at the second time, a product of the update matrix and the first uncertainty associated with the predicted vehicle state at the first time.

16. The non-transitory computer-readable media of claim 13, wherein the operations further comprise:
   determining, based on the predicted vehicle state at the first time and the first uncertainty, a predicted vehicle state and a third uncertainty associated with the predicted vehicle state at the second time;
   determining a position and an orientation of the vehicle at the second time from the predicted vehicle state at the second time; and
   determining a fourth uncertainty associated with the position and the orientation of the vehicle at the second time based at least in part on the third uncertainty associated with the predicted vehicle state at the second time.

17. The non-transitory computer-readable media of claim 13, wherein the operations further comprise:
   inputting the second vector representation of the environment at the second time to the first machine learned model;
   receiving, from the first machine learned model, a second output comprising a third vector representation of the environment at a third time; and
   determining a predicted vehicle state at the third time and a fifth uncertainty associated with the predicted vehicle state at third time based at least in part on:
      the third vector representation,
      a position and an orientation of the vehicle determined for the third time; and
      a sixth uncertainty associated with the position and the orientation of the vehicle determined for the third time.

18. The non-transitory computer-readable media of claim 13, wherein the first uncertainty associated with the predicted vehicle state at the first time is a first covariance matrix and the operations further comprise:
   determining that the first covariance matrix is singular; and
   identifying a second covariance matrix to replace the first covariance matrix, wherein the second covariance matrix is an invertible matrix.

19. The non-transitory computer-readable media of claim 13, wherein the first machine learned model is trained based at least in part on determining a difference between a ground truth trajectory of the vehicle recorded in log data and the predicted vehicle state at the first time and the first uncertainty associated with the predicted vehicle state at the first time to determine one or more differences and modifying a parameter of the first machine learned model based at least in part on the one or more differences.

20. The non-transitory computer-readable media of claim 13, wherein the operations further comprise:
   determining a first matrix corresponding to the first uncertainty associated with the predicted vehicle state at the first time;
   determining that the first matrix is singular; and
   identifying an invertible matrix to replace the first matrix.

* * * * *